(12) United States Patent
Kazawa et al.

(10) Patent No.: US 7,957,647 B2
(45) Date of Patent: Jun. 7, 2011

(54) PASSIVE OPTICAL NETWORK SYSTEM AND RANGING METHOD

(75) Inventors: Tohru Kazawa, Kokubunji (JP); Yusuke Yajima, Fujisawa (JP); Masaki Oohira, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 648 days.

(21) Appl. No.: 12/103,262

(22) Filed: Apr. 15, 2008

(65) Prior Publication Data

US 2009/0080891 A1 Mar. 26, 2009

(30) Foreign Application Priority Data

Sep. 21, 2007 (JP) ................................. 2007-245770

(51) Int. Cl.
*H04B 10/00* (2006.01)
(52) U.S. Cl. ................ 398/75; 398/72; 398/71; 398/70
(58) Field of Classification Search ............... 398/66–75
See application file for complete search history.

(56) References Cited

U.S. PATENT DOCUMENTS

| | | | |
|---|---|---|---|
| 5,930,018 A * | 7/1999 | Effenberger | 398/161 |
| 6,592,272 B1 * | 7/2003 | Masucci et al. | 398/47 |
| 6,697,374 B1 * | 2/2004 | Shraga et al. | 370/458 |
| 6,804,256 B2 * | 10/2004 | Chang | 370/468 |
| 6,868,232 B2 * | 3/2005 | Eijk et al. | 398/5 |
| 7,212,540 B2 * | 5/2007 | Unitt et al. | 370/452 |
| 7,242,868 B2 * | 7/2007 | Soto et al. | 398/72 |
| 7,369,768 B2 * | 5/2008 | Sakamoto et al. | 398/58 |
| 7,428,385 B2 * | 9/2008 | Lee et al. | 398/100 |
| 7,457,542 B2 * | 11/2008 | Sekine et al. | 398/72 |
| 7,548,548 B2 * | 6/2009 | Rakib et al. | 370/419 |
| 7,583,898 B1 * | 9/2009 | Dalton et al. | 398/100 |
| 7,620,319 B2 * | 11/2009 | Krimmel | 398/33 |
| 7,630,642 B2 * | 12/2009 | Tamai et al. | 398/77 |
| 2002/0063932 A1 * | 5/2002 | Unitt et al. | 359/168 |
| 2003/0091045 A1 * | 5/2003 | Choi et al. | 370/390 |
| 2003/0142626 A1 * | 7/2003 | Umayabashi et al. | 370/236.2 |
| 2004/0202174 A1 * | 10/2004 | Kim et al. | 370/395.1 |
| 2005/0163149 A1 * | 7/2005 | Unitt et al. | 370/442 |
| 2007/0237523 A1 * | 10/2007 | Miguel et al. | 398/71 |
| 2007/0274717 A1 * | 11/2007 | Xu et al. | 398/58 |
| 2008/0056719 A1 * | 3/2008 | Bernard et al. | 398/71 |
| 2009/0041460 A1 * | 2/2009 | Bernard et al. | 398/67 |

OTHER PUBLICATIONS

ITU-T, G.984.1, Mar. 2003.
ITU-T, G.984.2, Mar. 2003.
ITU-T, G.984.3, Feb. 2004.
ITU-T, G.984.4, Jun. 2004.

* cited by examiner

*Primary Examiner* — Agustin Bello
(74) *Attorney, Agent, or Firm* — Brundidge & Stanger, P.C.

(57) ABSTRACT

In a WDM-PON system wherein a plurality of ONUs transfer signals by sharing wavelengths, one wavelength dedicated to a ranging procedure is set, and the ranging is performed with only the dedicated wavelength, so as to measure reciprocating delay times. At the other wavelengths, transmission signals from a plurality of ONUs are transferred in time division multiplexing based on the obtained reciprocating delay times. An OLT includes a burst receiver circuit for only the wavelength dedicated to the ranging, and subsequently to the ranging, the OLT adjusts transmission amplitudes and transmission phases for the ONUs, so as to equalize received amplitudes and received phases in the OLT. For this purpose, the OLT includes means for measuring the amplitudes and phases of received signals, as the burst receiver circuit, and it includes a table for managing the received amplitudes and received phases of the respective ONUs.

11 Claims, 16 Drawing Sheets

RECEIVED BURST AMPLITUDE/PHASE MANAGEMENT TABLE (FIRST TIME)

| ONU-ID | RECEIVED AMPLITUDE DEVIATION | RECEIVED PHASE DEVIATION |
|---|---|---|
| 1 | +20dB | +1/8 |
| 2 | +15dB | -1/4 |
| 3 | +9dB | +3/16 |
| 4 | +4dB | 0 |
| 5 | +0.5dB | -7/8 |
| ... | ... | ... |

FIG. 8A

RECEIVED BURST AMPLITUDE/PHASE MANAGEMENT TABLE (SECOND TIME)

| ONU-ID | RECEIVED AMPLITUDE DEVIATION | RECEIVED PHASE DEVIATION |
|---|---|---|
| 1 | +4dB | +1/8 |
| 2 | +2dB | -1/4 |
| 3 | -0.5dB | +3/16 |
| 4 | +0.5dB | 0 |
| 5 | 0dB | -7/8 |
| ... | ... | ... |

FIG. 8B

RECEIVED BURST AMPLITUDE/PHASE MANAGEMENT TABLE (THIRD TIME)

| ONU-ID | RECEIVED AMPLITUDE DEVIATION | RECEIVED PHASE DEVIATION |
|---|---|---|
| 1 | +1dB | 0 |
| 2 | 0dB | 0 |
| 3 | 0dB | 0 |
| 4 | 0dB | 0 |
| 5 | 0dB | 0 |
| ... | ... | ... |

FIG. 8C

RECEIVED BURST AMPLITUDE/PHASE MANAGEMENT TABLE (FINAL TIME)

| ONU-ID | RECEIVED AMPLITUDE DEVIATION | RECEIVED PHASE DEVIATION |
|---|---|---|
| 1 | 0dB | 0 |
| 2 | 0dB | 0 |
| 3 | 0dB | 0 |
| 4 | 0dB | 0 |
| 5 | 0dB | 0 |
| ... | ... | ... |

FIG. 8D

PASSIVE OPTICAL NETWORK SYSTEM AND RANGING METHOD

BACKGROUND OF THE INVENTION

The present invention relates to a passive optical network system and a ranging method. More particularly, it relates to a passive optical network system in which communications are performed by wavelength division multiplexing and time division multiplexing in a passive optical network "PON" wherein a plurality of subscriber connection devices share an optical transmission line, and a ranging method in the passive optical network system.

A Passive Optical Network (PON) includes an Optical Line Termination (OLT), and a plurality of Optical Network Units (ONUs) or Optical Network Terminations (ONTs). Signals from terminals (PCs etc.) connected to the ONUs are sent to the OLT in such a way that the optical signals are optically multiplexed on an optical fiber leading to the OLT, through the ONUs, optical fibers and an optical splitter. After the OLT has executed various signal processes, communications from the terminals of certain ones of the ONUs with the terminals of the other ONUs of the pertinent PON or with the terminals of another network NW are performed. The above optical multiplexing covers the systems of Time Division Multiplexing (TDM), Wavelength Division Multiplexing (WDM), Code Division Multiplexing (CDM), and so forth. By way of example, G-PON stipulated by ITU-T Recommendation G. 984. 3 is a system wherein different wavelengths are used between in an uplink and in a downlink, and wherein the communications between an OLT (Optical Line Terminal) located at a central office and the ONUs (Optical Network Units) located at individual users are based on signals conforming to time division multiplexing (TDM) in which signal communication times are assigned to the respective ONUs.

In the TDM system, the individual ONUs are disposed at will within the range of, for example, optical fiber lengths of 0-20 km, 20 km-40 km, or 40 km-60 km as stipulated in Chapter 8 and Chapter 9 of ITU-T Recommendation G. 984. 1 (Non-patent Document 1 being ITU-T Recommendation G. 984. 1). Under this condition, therefore, transmission delays are different, and the optical signals might collide and interfere even when the individual ONUs have outputted the optical signals at the assigned signal communication times. For this reason, the optical signals from the individual ONUs are prevented from interfering on the optical fiber which leads to the OLT, in such a way that the delays of the output signals from the ONUs are adjusted as if these ONUs were disposed at equal distances (for example, 20 km), by employing a technique called "ranging" as stipulated in Chapter 10 of ITU-T Recommendation G. 984. 3 (Non-patent Document 3 being ITU-T Recommendation G. 984. 3). Further, the head of the signal from each ONU bears a guard time of 12 bytes for preventing the interference, a preamble which is utilized for the determination of the identification threshold value of a receiver and the extraction of a clock, and a delimiter which is utilized for identifying the delimitation of a received signal, as stipulated in Chapter 8. 8. 3 of Recommendation G. 984. 2 (Non-patent Document 2 being ITU-T Recommendation G. 984. 2).

By way of example, in the stipulation of Chapter 8. 2 of ITU-T Recommendation G. 984. 3, the signals which are transferred from the plurality of ONUs toward the OLT are called "uplink signals", each of which contains the preamble, the delimiter and a payload signal. Besides, as shown in FIG. 8-2 in Chapter 8 of the recommendation, the guard time is set immediately before each uplink signal in order to prevent this uplink signal from colliding with a preceding burst signal. On the other hand, in accordance with the stipulation of Chapter 8. 1 of the recommendation, the signals which are transmitted from the OLT toward the plurality of ONUs are called "downlink signals", each of which contains a frame synchronization pattern, a PLOAM field, a US Bandwidth MAP field and a frame payload. As indicated in Chapter 8. 1. 3. 6 of the recommendation, the OLT designates the uplink transmission permission timing of each ONU by using the field called "US Bandwidth MAP". The US Bandwidth MAP field contains a "Start" value for designating the start of a transmission permission, and an "End" value for designating the end thereof, and the start and the end are respectively designated in byte units. The values are also called "grant values" in the sense that the transmission is permitted. In addition, the difference between the "End" value and the next "Start" value is a no-uplink signal field, which corresponds to the guard time. Incidentally, a plurality of bandwidth assignment units called "T-CONUs" can be allocated to the individual ONUs, and the designation of the uplink transmission permission timing is done every T-CONU.

In the ranging, the OLT requests the ONU to transmit a signal for distance measurement. When the ONU sends a distance measurement frame in reply, the OLT receives the signal of the frame, and it measures a time period since the transmission request for the distance measuring signal, till the reception of the signal of the distance measurement frame, that is, a reciprocating delay time, thereby to know how distant the ONU is from the OLT. Subsequently, in order that all the ONUs may be caused to seem at equal distances, the OLT instructs the individual ONUs to delay transmissions a time period called "equalization delay". By way of example, in order to endow all the ONUs with a reciprocating delay time of 20 km, an equalization delay which is equal to [(the reciprocating delay time of 20 km)–(the measured reciprocating delay time)] is indicated to the ONUs as the instruction. The ONUs include circuits each of which transmits data with the fixed delay of the indicated equalization delay, and the uplink data transmissions are performed in compliance with the instruction so that all the ONUs may have the reciprocating delay time of 20 km.

Meanwhile, in the WDM system, a plurality of waves of different wavelengths are connected for both uplink signals and downlink signals between an OLT and ONUs, and the individual ONUs perform communications by receiving and transmitting specified wavelengths. The communications are performed by assigning the individual wavelengths from the OLT to the ONUs, whereby a communication bandwidth can be remarkably enhanced. One realization method for a WDM-PON in which the ONUs can be connected up to 32 units, is to assign one wavelength for each of the uplink and downlink of each ONU. That is, the number of wavelengths for use in one PON is set at double the maximum number (for example, 32 units) of the ONUs to be connected (32 wavelengths for the downlinks, and 32 wavelengths for the uplinks). In this case, one wavelength is occupied by one ONU, and hence, receivers which are equal in number to the wavelengths are required. On the other hand, however, the ranging procedure stated above is dispensed with, and the OLT need not include any burst signal receiver circuit requiring a high degree of technique as has been needed in the prior-art TDM-PON.

SUMMARY OF THE INVENTION

Here, it is also possible to consider that even the WDM-PON which can connect the ONUs up to 32 units follows the concept of the prior-art TMD-PON, and that the number of downlink wavelengths is limited to m (being at most 32), while the number of uplink wavelengths is limited to n (being at most 32), whereby the number of expensive optical components is decreased to economically build a PON. By way of example, one wavelength is used by a plurality of ONUs, and individual wavelengths are subjected to the TDM in order to perform communications.

On this occasion, however, transmission signals from a plurality of ONUs are time-division-multiplexed and transferred as uplink signals, and hence, the ranging procedure stated before is necessitated in spite of the WDM-PON. In the ranging, a reciprocating delay time needs to be measured every ONU as explained before. It is therefore indispensable to set the no-signal field called "ranging window". By way of example, in order to measure the reciprocating delay time of the ONU located at a distance of at most 20 km from the OLT, a ranging window of 200 microseconds needs to be opened, and ordinary communications cannot be performed meantime. On the other hand, in order to activate the ONU at high speed, the distance measurement should desirably be performed by opening the ranging window at a frequency on the order of one time in one millisecond. Then, in this example, the field of 200 microseconds must be set as the no-signal field within one millisecond, and the loss of a bandwidth attributed to the no-signal field extends to 20%.

Besides, as stated before, the OLT needs to include the burst receiver circuits in the number of the uplink wavelengths. The burst receiver circuit requires a higher degree of technique as compared with a receiver circuit for a continuous signal, and its circuit scale enlarges. Therefore, the inclusion of the burst receiver circuits in the number of the uplink wavelengths might spoil the economy of the PON system.

In view of the above drawbacks, one object of the present invention is to provide in a WDM-PON system wherein a plurality of ONUs transfer signals by sharing wavelengths, a passive optical network system in which the decrease of a utilization bandwidth attributed to a ranging procedure is suppressed to the utmost, and a ranging method in the passive optical network system. Another object of the invention is to provide a communication system of excellent economy in which an OLT includes only one burst receiver circuit by avoiding the inclusion of burst receiver circuits that require a high degree of technique, in the number of uplink wavelengths.

The first problem (or object) can be solved (or accomplished) in such a way, for example, that one wavelength dedicated to ranging is included so as to perform the ranging with only the dedicated wavelength and to measure reciprocating delay times, and that transmission signals from a plurality of ONUs are transferred in time division multiplexing on the basis of the obtained reciprocating delay times, at the other wavelengths. The wavelength dedicated to the ranging is used only in the ranging, and after the ranging, the individual ONUs change-over the dedicated wavelength to the other wavelengths and communicate at a high efficiency, so that a bandwidth is not wasted. As another advantage of this solution means, it is mentioned that a ranging window can be opened without caring about the efficiency of signal transfer. Accordingly, a ranging cycle is made still shorter than one millisecond, whereby the activation time of the ONU can be further shortened.

The second problem (or object) is solved (or accomplished) in such a way, for example, that a burst receiver circuit is included only for the wavelength dedicated in the ranging as is used in the above solution means, and that, subsequently to the ranging procedure, the individual ONUs are subjected to the control of adjusting transmission amplitudes and transmission phases, so as to equalize received amplitudes and received phases in an OLT. For this purpose, the OLT includes means for measuring the amplitudes and phases of received signals, as the burst receiver circuit. Besides, the OLT includes a table for managing the received amplitudes and received phases of the respective ONUs, and it writes into the management table, the differences between the received amplitude and received phase expected finally and the amplitudes and phases measured at the first ranging procedure. Further, the OLT transmits control messages to the respective ONUs in the direction of decreasing the differences, and thereafter it measures the differences between the received amplitude and received phase expected finally and the amplitudes and phases of the received signals again. Owing to the repetition of such operations, the received amplitudes and received phases from all the ONUs can be finally equalized to expectation values. The plurality of times of controls have been permitted in practical use for the first time by assigning the wavelength dedicated to the ranging, and loops for controlling the received amplitudes and received phases from the ONUs can be turned any number of times without caring about the efficiency of the signal transfer.

In, for example, a WDM-PON system wherein an OLT, optical fibers, an optical splitter and a plurality of ONUs are included and wherein each of the ONUs includes a wavelength control unit which variably controls a transmission wavelength and a receiver wavelength, a WDM-PON system according to the present invention has as one of characterizing features, that one of wavelengths which are used for communications from the OLT to the ONUs is dedicated to ranging.

Besides, the WDM-PON system has as one of the characterizing features, that the OLT includes a WDM filter which discriminates received signals separately for the wavelengths, a burst receiver circuit which is connected to the output port of the wavelength dedicated to the ranging as has been discriminated by the WDM filter, and receivers for continuous signals as are connected to the ports of the other signal wavelengths outputted from the WDM filter.

The WDM-PON system has as one of the characterizing features, that the OLT includes means for measuring the amplitudes and phases of received signals, a table for managing the received amplitudes and received phases of the respective ONUs, and means for transmitting messages for controlling transmission amplitudes and transmission phases, to the ONUs.

The WDM-PON system has as one of the characterizing features, that each of the ONUs includes means for adjusting the transmission amplitude and transmission phase on the basis of the control message from the OLT.

In, for example, a WDM-PON system wherein an OLT, optical fibers, an optical splitter and a plurality of ONUs are included and wherein each of the ONUs includes a wavelength control unit which variably controls a transmission wavelength and a receiver wavelength, a ranging method in a WDM-PON system according to the invention has as one of characterizing features:

that one of wavelengths which are used for communications from the OLT to the ONUs is dedicated to ranging;

that the OLT includes means for measuring the amplitudes and phases of received signals, a table for managing the received amplitudes and received phases of the respective ONUs, and means for transmitting messages for controlling transmission amplitudes and transmission phases, to the ONUs;

that each of the ONUs includes means for adjusting the transmission amplitude and transmission phase on the basis of the control message from the OLT; and that the OLT evaluates the differences between the received amplitudes and received phases of burst signals received at the ranging and an expected received amplitude and expected received phase, that the OLT transmits the control messages for adjusting the transmission amplitudes and transmission phases, to the ONUs in the direction of decreasing the differences, and that the ONUs subsequently adjust the transmission amplitudes and transmission phases on the basis of the contents of the received control messages.

According to the first solving means of this invention, there is provided a passive optical network system including an optical line termination device, an optical splitter, and a plurality of optical network units which are connected to the optical line termination device through optical fibers and the optical splitter, wherein the optical line termination device and the optical network units communicate in wavelength division multiplexing and in time division multiplexing of individual wavelengths;

wherein:

the passive optical network system has a first wavelength at which signals for performing predetermined ranging process between the optical line termination device and the optical network units are transmitted and received, and a plurality of second wavelengths at which the optical line termination device and the optical network units communicate;

the optical line termination device performs the ranging process with respect to the optical network units by using the first wavelength, so as to give the individual optical network units instructions of an equalization delay for causing the respective optical network units to delay and transmit signals, in order that the optical line termination device itself and the plurality of optical network units may seem to be equally distant, and the optical line termination device communicates with the optical network units by using the second wavelengths; and each of the optical network units comprises:

an equalization delay storage unit in which the equalization delay given by the optical line termination device is stored;

a receiver which receives the signal at the set receiver wavelength;

a transmitter which transmits the signal at the set transmission wavelength by being delayed on the basis of the equalization delay stored in said equalization delay storage unit; and a wavelength control unit which sets the transmission wavelength of said transmitter and the receiver wavelength of said receiver at the first wavelength, so as to transmit and receive the signals for the ranging process, and which sets the transmission wavelength of said transmitter and the receiver wavelength of said receiver at an assigned one of the second wavelengths after the ranging process, so as to communicate with the optical line termination device.

According to the second solving means of this invention, there is provided a passive optical network system including an optical line termination device, an optical splitter, and a plurality of optical network units which are connected to the optical line termination device through optical fibers and the optical splitter, wherein the optical line termination device and the optical network units communicate in wavelength division multiplexing and in time division multiplexing of individual wavelengths;

wherein:

the passive optical network system has a first wavelength at which signals for performing predetermined ranging process between the optical line termination device and the optical network units are transmitted and received, and a plurality of second wavelengths at which the optical line termination device and the optical network units communicate;

the optical line termination device performs the ranging process with respect to the optical network units by using the first wavelength, so as to give the individual optical network units instructions of an equalization delay for causing the respective optical network units to delay and transmit signals, in order that the optical line termination device itself and the plurality of optical network units may seem to be equally distant, and the optical line termination device communicates with the optical network units by using the second wavelengths;

each of the optical network units comprises:

an equalization delay storage unit in which the equalization delay given by the optical line termination device is stored;

a third receiver which receives the signal at the set receiver wavelength;

a third transmitter which transmits the signal at the set transmission wavelength by being delayed on the basis of the equalization delay stored in said equalization delay storage unit;

a fourth receiver which receives the signal at the first wavelength;

a fourth transmitter which transmits the signal at the first wavelength by being delayed on the basis of the equalization delay stored in said equalization delay storage unit; and a wavelength control unit which sets the transmission wavelength of said third transmitter and the receiver wavelength of said third receiver at an assigned one of the second wavelengths, so as to communicate with the optical line termination device; and each of the optical network units transmits and receives, at the first wavelength, the signals for the ranging process, and/or an amplitude/phase control signal for adjusting an amplitude and a phase of the signal to be outputted to the optical line termination device, concurrently with the communication with the optical line termination device at the second wavelength.

According to the third solving means of this invention, there is provided a ranging method in a passive optical network system including an optical line termination device, an optical splitter, and a plurality of optical network units which are connected to the optical line termination device through optical fibers and the optical splitter, wherein the optical line termination device and the optical network units communicate in wavelength division multiplexing and in time division multiplexing of individual wavelengths;

the system having a first wavelength at which signals for performing predetermined ranging process between the optical line termination device and the optical network units are transmitted and received, and a plurality of second wavelengths at which the optical line termination device and the optical network units communicate;

the method comprising the steps of:

allowing the optical line termination device to perform the ranging process with respect to the optical network units by using the first wavelength, so as to give the individual optical network units instructions of an equalization delay for causing the respective optical network units to delay and transmit signals, in order that the optical line termination device and the plurality of optical network units may seem to be equally distant, and allowing the optical line termination device to communicate with the optical network units by using the second wavelengths; and allowing each of the optical network units:

to store the equalization delay given by the optical line termination device, and to transmit the signal to be outputted to the optical line termination device, with a delay based on the equalization delay;

to set a transmission wavelength and a receiver wavelength at the first wavelength, and to transmit and receive the signals for the ranging process; and to set a transmission wavelength and a receiver wavelength at an assigned one of the second wavelengths after the ranging process, and to communicate with the optical line termination device.

In accordance with the present invention, in a WDM-PON system wherein a plurality of ONUs transfer signals by sharing wavelengths, it is possible to provide a passive optical network system in which the decrease of a utilization bandwidth attributed to a ranging procedure is suppressed to the utmost, and a ranging method in the passive optical network system. Further, in accordance with the invention, it is possible to provide a communication system in which only one burst receiver circuit requiring a high degree of technique suffices, thereby to attain an excellent economy.

BRIEF DESCRIPTION OF THE DRAWINGS

FIGS. 8A-8D are configurational diagrams each showing a received burst amplitude/phase management table in the invention;

DESCRIPTION OF THE PREFERRED EMBODIMENTS

Figure 1:
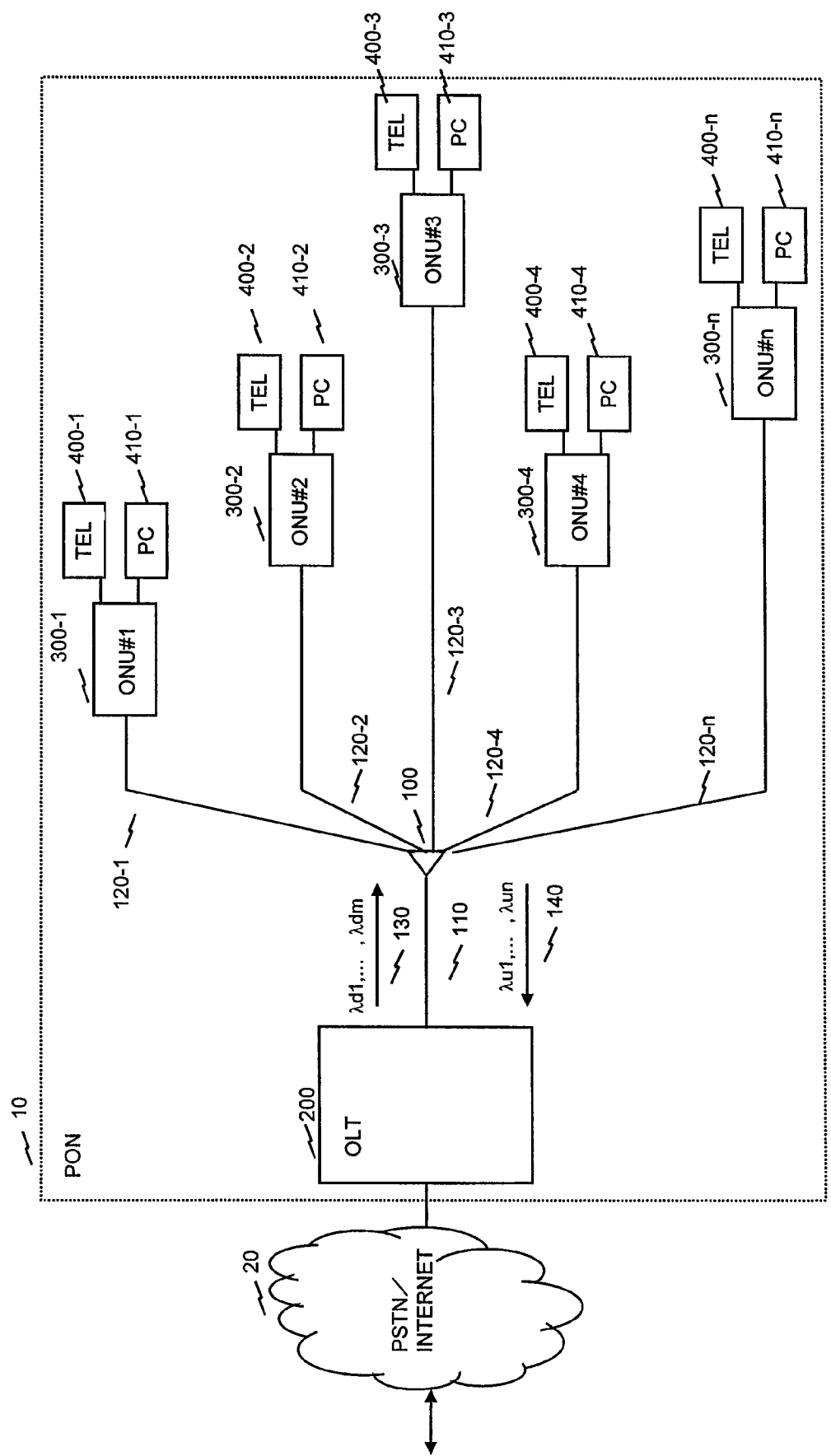
FIG. 1 is a configurational diagram of an optical access network to which the present invention is applied.

FIG. 1 shows the configuration of an optical access network.

A PON 10 is connected to a PSTN/Internet 20 so as to transmit and receive data. The PON 10 includes, for example, an optical splitter 100, a main line fiber 110, branch line fibers 120, an OLT 200 and a plurality of ONUs 300. Further, the PON 10 may well include telephone sets 400 and personal computers 410 which are connected to the corresponding ONUs 300. Incidentally, although the ONUs 300 may well be ONTs, they shall be described as the ONUs in this embodiment.

The ONUs 300 numbering, for example, 32 can be connected to the OLT 200 through the single main line fiber 110, the optical splitter 100 and the branch line fibers 120. In the example of FIG. 1, five ONUs are illustrated, and their fiber lengths from the OLT 200 are respectively different. In the illustrated example, the ONU 300-1 is 1 km in terms of the fiber length from the OLT 200, the ONU 300-2 is 10 km in terms of the fiber length from the OLT 200, the ONU 300-3 is 20 km in terms of the fiber length from the OLT 200, the ONU 300-4 is 10 km in terms of the fiber length from the OLT 200, and the ONU 300-$n$ is 15 km in terms of the fiber length from the OLT 200.

A signal 130 which is transferred in the direction (downlink direction) of from the OLT 200 to the ONUs 300, is transferred in a state where signals destined for the respective ONUs 300 undergo wavelength division multiplexing and time division multiplexing. Whether or not the signal received by each of the ONUs 300 is a signal destined for the pertinent ONU 300, is decided within the ONU 300, and the signal is sent to the telephone set 400 or the personal computer 410 on the basis of the destination of this signal. Besides, in the direction (uplink direction) of from the ONUs 300 to the OLT 200, a signal 120-1 which is transferred from the ONU 300-1, a signal 120-2 which is transferred from the ONU 300-2, a signal 120-3 which is transferred from the ONU 300-3, a signal 120-4 which is transferred from the ONU 300-4, and a signal 120-$n$ which is transferred from the ONU 300-$n$ pass through the optical splitter 100. Thereafter, these signals are subjected to wavelength division multiplexing and time division multiplexing into a signal 140, which arrives at the OLT 200. Since the fiber lengths between the ONUs 300 and the OLT 200 are different, the signal 140 takes a form in which signals of different amplitudes are multiplexed.

Wavelengths $\lambda d1, \lambda d2, \ldots$, and $\lambda dm$ numbering m are used for the communications of downlink signals which proceed from the OLT 200 to the ONUs 300. On the other hand, wavelengths $\lambda u1, \lambda u2, \ldots$, and $\lambda un$ numbering n are used for the communications of uplink signals which proceed from the ONUs to the OLT. Each of the wavelengths can be used for one ONU 300, or for any plurality of ONUs 300 in common. In this embodiment, the downlink wavelength $\lambda d1$ is a common wavelength which is shared when all the ONUs 300 are activated, while the uplink wavelength $\lambda u1$ is a wavelength dedicated to ranging, which is used in common only when all the ONUs 300 are activated.

Figure 2:
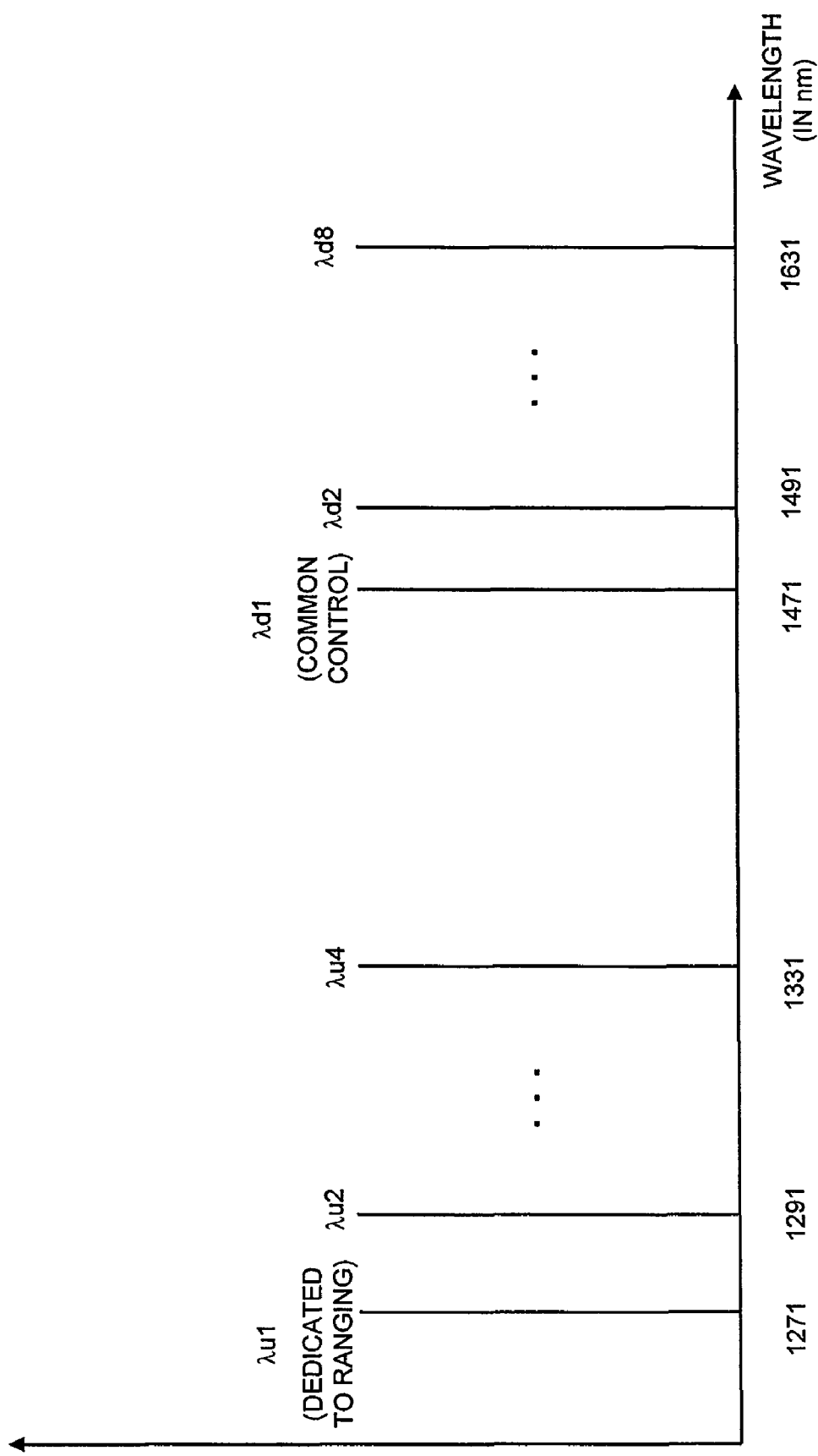
FIG. 2 is a diagram showing a wavelength assignment example in the invention.

FIG. 2 shows a wavelength arrangement example in this embodiment.

In this embodiment, by way of example, eight (m=8) downlink wavelengths and four (n=4) uplink wavelengths are used, and the respective wavelengths are arranged at intervals of 20 nm so as to have a sufficient fluctuation immunity against a wavelength fluctuation attendant upon an ambient temperature fluctuation. As stated above, the downlink wavelength $\lambda d1$ is the common wavelength which is shared when all the ONUs 300 are activated, and the uplink wavelength $\lambda u1$ is the wavelength dedicated to the ranging, which is used in common only when all the ONUs 300 are activated. Incidentally, the number of wavelengths and the assigned values of the wavelengths can be appropriately determined. Hereinbelow, the wavelengths λd1 and λu1 will be sometimes termed the "first wavelength" collectively, and the other plurality of wavelengths the "second wavelength".

Figure 3:
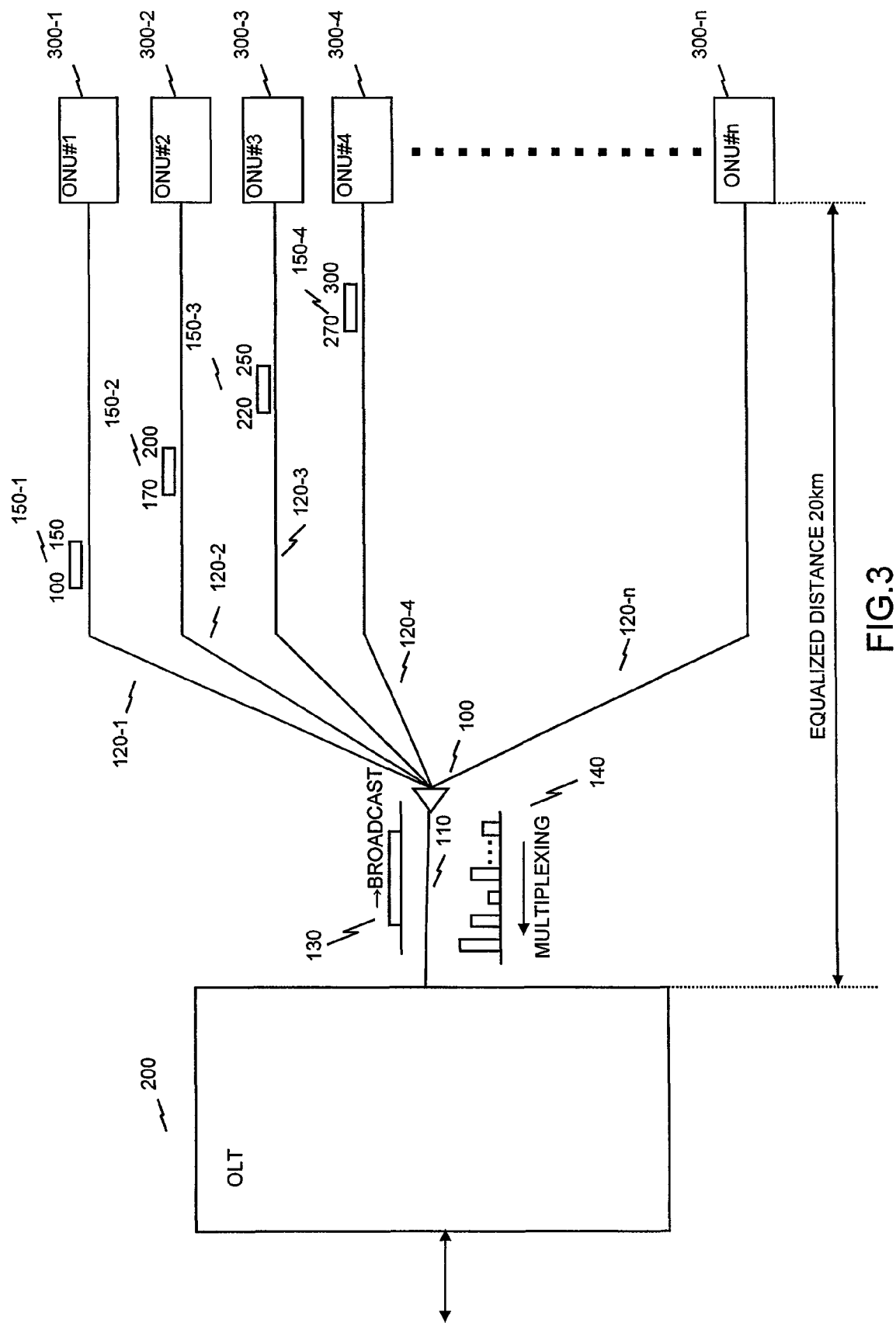
FIG. 3 is a diagram for explaining a ranging operation in the optical access network to which the invention is applied.

FIG. 3 shows a diagram for explaining a ranging operation in the optical access network.

The OLT 200 measures respective distances to the ONU 300-1, ONU 300-2, ONU 300-3, ONU 300-4 and ONU 300-$n$, in conformity with the ranging procedure (ranging process) indicated in ITU-T Recommendation G. 984. 3, and it sets a value called "equalization delay", every ONU so that all the ONUs 300 may seem at equal distances from the OLT 200. Owing to this operation, all the ONUs 300 can be handled as if they were connected at, for example, 20 km. A mechanism for this operation will be detailed below.

Figure 4:
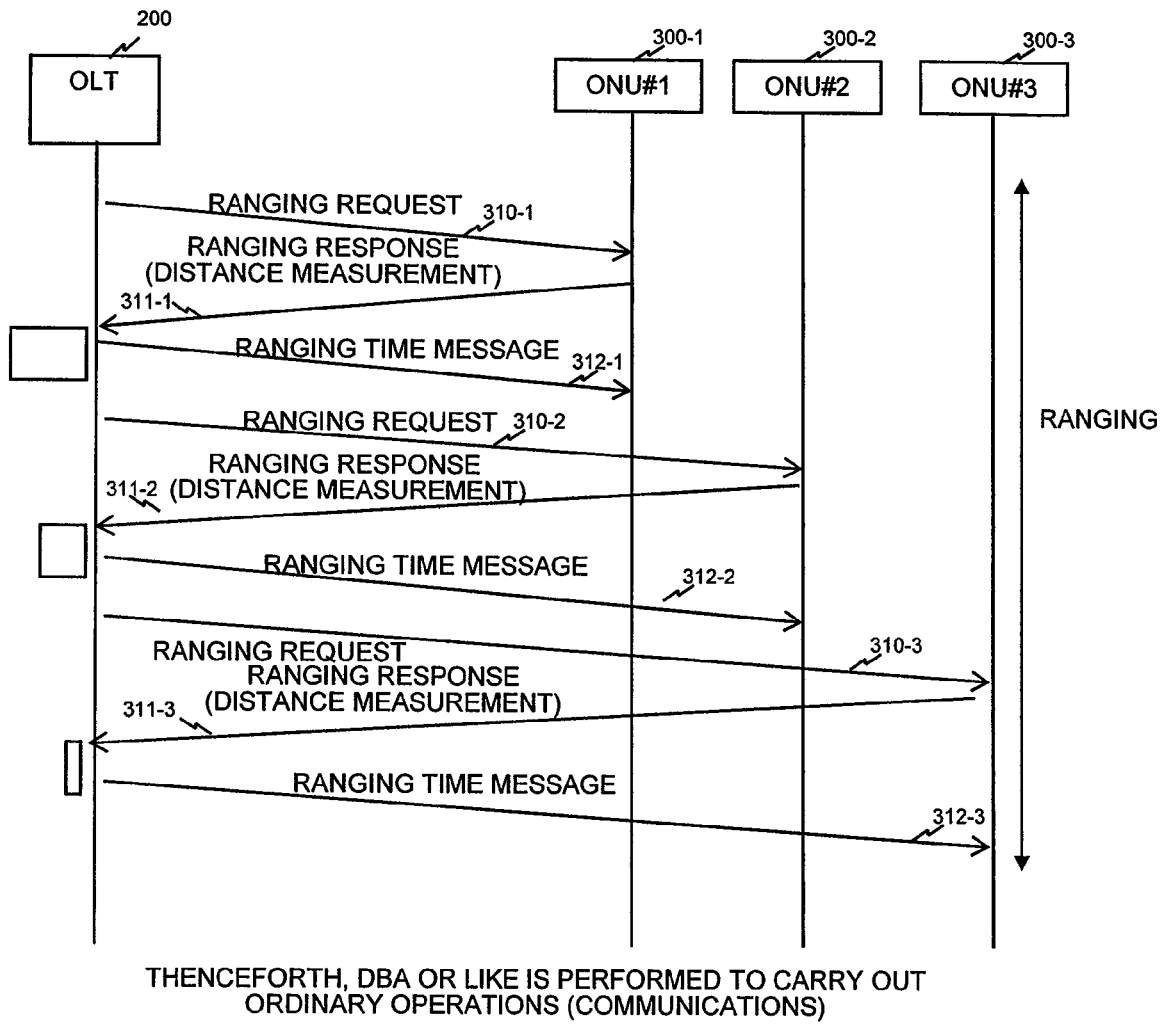
FIG. 4 is a diagram of ranging signals in the optical access network to which the invention is applied.

FIG. 4 shows ranging signals in the optical access network.

The OLT 200 transmits a ranging request signal 310-1 toward the ONU 300-1. In the example of FIG. 4, the OLT 200 transmits ranging request signals 310 to the individual ONUs 300, respectively, but it may well perform broadcast as shown in FIG. 3. When the ONU 300-1 has received the ranging request signal 310-1, it transmits a ranging response signal 311-1 to the OLT 200 after a predetermined time interval. The OLT 200 decides the distance to the ONU 300-1, on the basis of the difference between the transmission timing of the ranging request signal 310-1 and the reception timing of the ranging response signal 311-1. Subsequently, the OLT 200 transmits a ranging time message 312-1 so as to set an equalization delay 330-1 for the ONU 300-1. Owing to the function of the equalization delay 330-1, the ONU 300-1 is adjusted as if the distance from the OLT 200 were 20 km, irrespective of its physical location position as shown in FIG. 3. Subsequently, the distances of the ONUs 300-2 and 300-3 are similarly measured.

Thereafter, the OLT 200 transmits a grant signal and a request report signal. Thus, the OLT 200 gives the ONUs 300-1, 300-2 and 300-3 upward transmission permissions and requests them to notify transmission requests. Thenceforth, a dynamic bandwidth allocation (DBA) or the like is performed to carry out an ordinary operations (communications).

Figure 5:
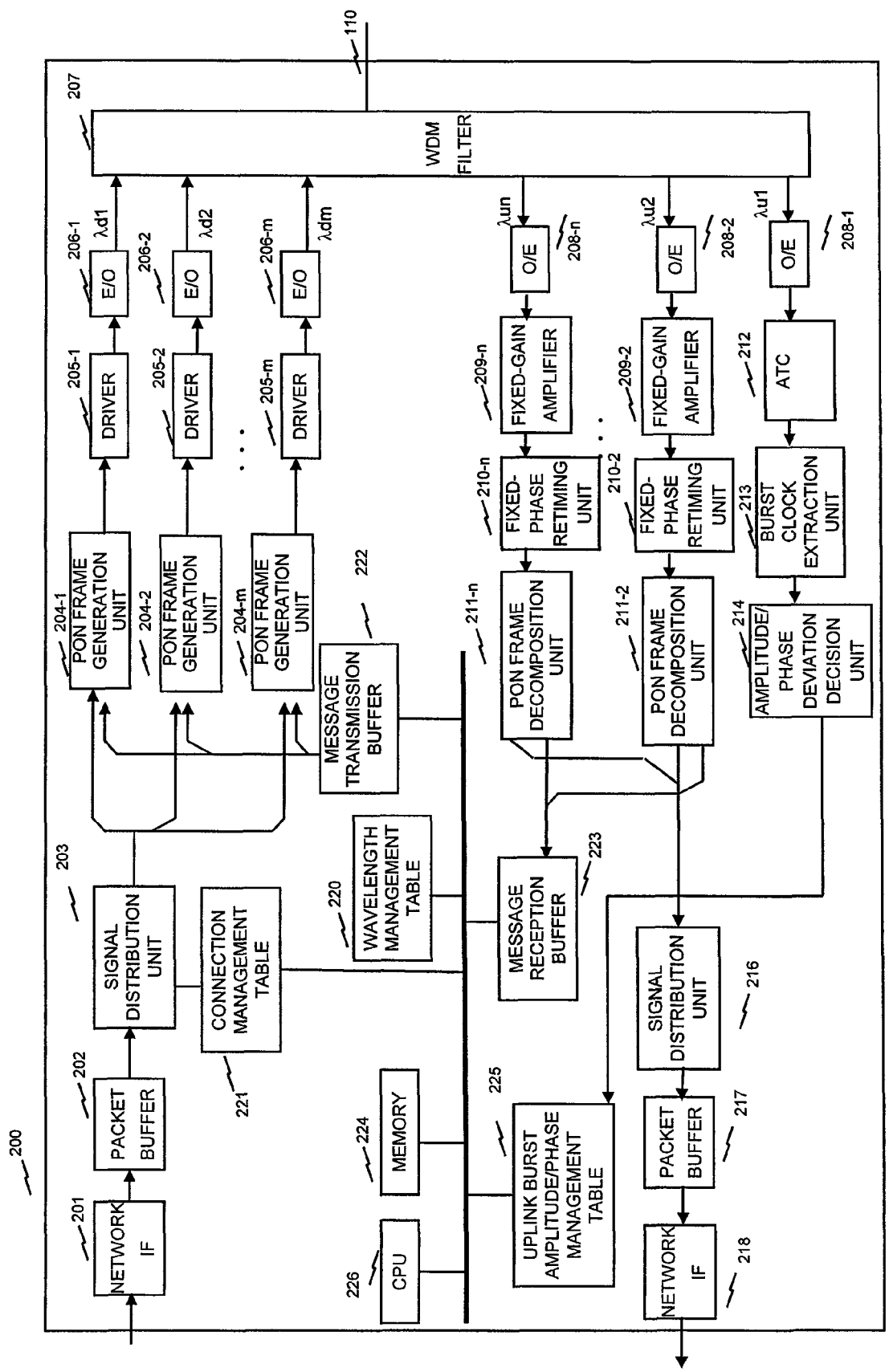
FIG. 5 is a configurational diagram of an OLT in the invention.

FIG. 5 shows a configurational example of the OLT 200 in this embodiment.

The OLT 200 includes, for example, a network IF 201, a packet buffer 202, a signal distribution unit 203, a connection management table 221, PON frame generation units 204, drivers 205, E/Os 206, a WDM filter 207, O/Es 208, amplifiers 209, fixed-phase retiming units 210, PON frame decomposition units 211, a signal multiplexing unit 216, a packet buffer 217, a network IF 218, a CPU (first control unit) 226, a memory 224, a message transmission buffer 222, a message reception buffer 223, a wavelength management table 220, an ATC (Automatic Threshold Control) 212, a burst clock extraction unit 213, an amplitude/phase deviation decision unit 214, and an uplink burst amplitude/phase management table (amplitude/phase management area) 225.

The network IF 201 receives a signal from the PSTN/Internet 20. The signal is once stored in the packet buffer 202. The signal distribution unit 203 reads a VLAN (Virtual Local Area Network)-ID or the like label affixed to a packet signal, it fetches a corresponding ONU No. by referring to the connection management table 221, and it transfers the packet signal to a corresponding block among the PON frame generation units 204-1 through 204-$m$. By way of example, which of the wavelengths is to be used is previously determined depending upon ONU Nos., and the packet signal is transferred to any of the PON frame generation units 204 in accordance with the wavelength. By the way, in this embodiment, m=8 is set as shown in FIG. 2.

When the number of the downlink wavelengths for use is m, the OLT 200 includes the m PON frame generation units 204, drivers 205 and E/Os 206. The PON frame generation unit 204 generates an electric transmission signal by adding the overhead of a PON section, and the driver 205 converts the electric signal into an optical signal by current-driving the E/O 206 and transmits the optical signal through the WDM filter 207.

On the other hand, when the number of the uplink wavelengths for use is n, the OLT 200 includes the n O/Es 208, (n−1) fixed-gain amplifiers 209, (n−1) fixed-phase retiming units 210 and (n−1) PON frame decomposition units 211. By the way, in this embodiment, n=8 is set as shown in FIG. 2. A signal received through the WDM filter 207 is converted into an electric signal by the O/E 208, and the electric signal is amplified by the amplifier 209 and is retimed by the fixed-phase retiming unit (clock extraction unit) 210. An overhead is separated by the PON frame decomposition unit 211, and the resulting signal is outputted from the network IF 218 onto the network side through the signal multiplexing unit 216 as well as the packet buffer 217.

Meanwhile, by way of example, the ATC (Automatic Threshold Control) 212 is connected to the O/E 208-1, and the burst clock extraction unit 213 and the amplitude/phase deviation decision unit 214 are connected in this order. A ranging burst signal from the wavelength λu1 dedicated to the ranging is received by the ATC 212 and the burst clock extraction unit 213 (these constituents shall be termed a "burst receiver circuit"). Further, the deviations (amplitude deviation and phase deviation) of the actual received signal from an expected received amplitude and an expected received phase are measured by the amplitude/phase deviation decision unit 214, and the contents of the deviations are sent to and stored in the uplink burst amplitude/phase management table 225.

Besides, the CPU 226 and the memory 224 execute the supervisory controls of the various units within the OLT 200, in a pair, and they make settings for associating the labels of packets and the Nos. of destination ONUs, in the connection management table 221 in compliance with instructions from a host system. The connection management table 221 contains, for example, an entry for storing the serial Nos. of the ONUs 300, an entry for storing the connection labels, and an entry for storing ONU-IDs. Before the ONUs 300 are activated, the values of the connection labels corresponding to the respective serial Nos. are set in compliance with the instructions of, for example, the CPU 226. The values of, for example, VLAN-IDs are usable as the connection labels.

Besides, the CPU 226 and the memory 224 register the correspondences between the destination ONUs and wavelength assignments, in the wavelength management table 220 in compliance with instructions from the host system, and they exchange wavelength assignment messages with the individual ONUs 300-1 through 300-$n$ by using the message transmission buffer 222 and the message reception buffer 223, thereby to set service wavelengths for the respective ONUs. The wavelength management table 220 contains, for example, an entry for the ONU-IDs, an entry for the serial Nos., an entry for the downlink wavelengths, and an entry for the uplink wavelengths.

By the way, in this embodiment, the PON frame generation unit 204-1, driver 205-1 and E/O 206-1, for example, will be sometimes termed the "first transmitter". The first transmitter transmits a signal for performing the ranging process with the first wavelength. Besides, the PON frame generation units 204-2 through 204-$m$, drivers 205-2 through 205-$m$, and E/Os 206-2 through 206-*m*, for example, will be sometimes termed the "second transmitters". The second transmitters transmit signals for communicating with the ONUs 300 with the second wavelength. The O/E 208-1, ATC 212, burst clock extraction circuit 213 and amplitude/phase deviation decision unit 214, for example, will be sometimes termed the "first receiver". The first receiver receives a signal for performing the ranging process with the first wavelength. Besides, the O/Es 208-2 through 208-*n*, fixed-gain amplifiers 209-2 through 209-*n*, fixed-phase timing units 210-2 through 210-*n*, and PON frame decomposition units 211-2 through 211-*n*, for example, will be sometimes termed the "second receivers". The second receivers receive signals for communicating with the ONUs 300 with the second wavelength.

FIGS. 8A-8D show configurational examples of the received burst amplitude/phase management table 225 in this embodiment.

The received burst amplitude/phase management table 225 stores, for example, the deviations of an amplitude and a phase from expected received values every ONU-ID. As shown in FIG. 8A, comparatively large deviation values are exhibited before the transmission amplitude and the transmission phase are adjusted every ONU 300 by the OLT 200. As shown in FIG. 8D, however, the values of the deviations become zero after the adjustments have ended, and the receiver circuit (the second receivers) of the OLT 200 can properly receive the burst signals from the plurality of ONUs 300 with clocks of fixed gain and fixed phase. The operations of adjusting the transmission amplitude and the transmission phase every ONU by the OLT 200 as shown in FIGS. 8A to 8D will be described with reference to FIGS. 12 and 10 later.

Figure 6:
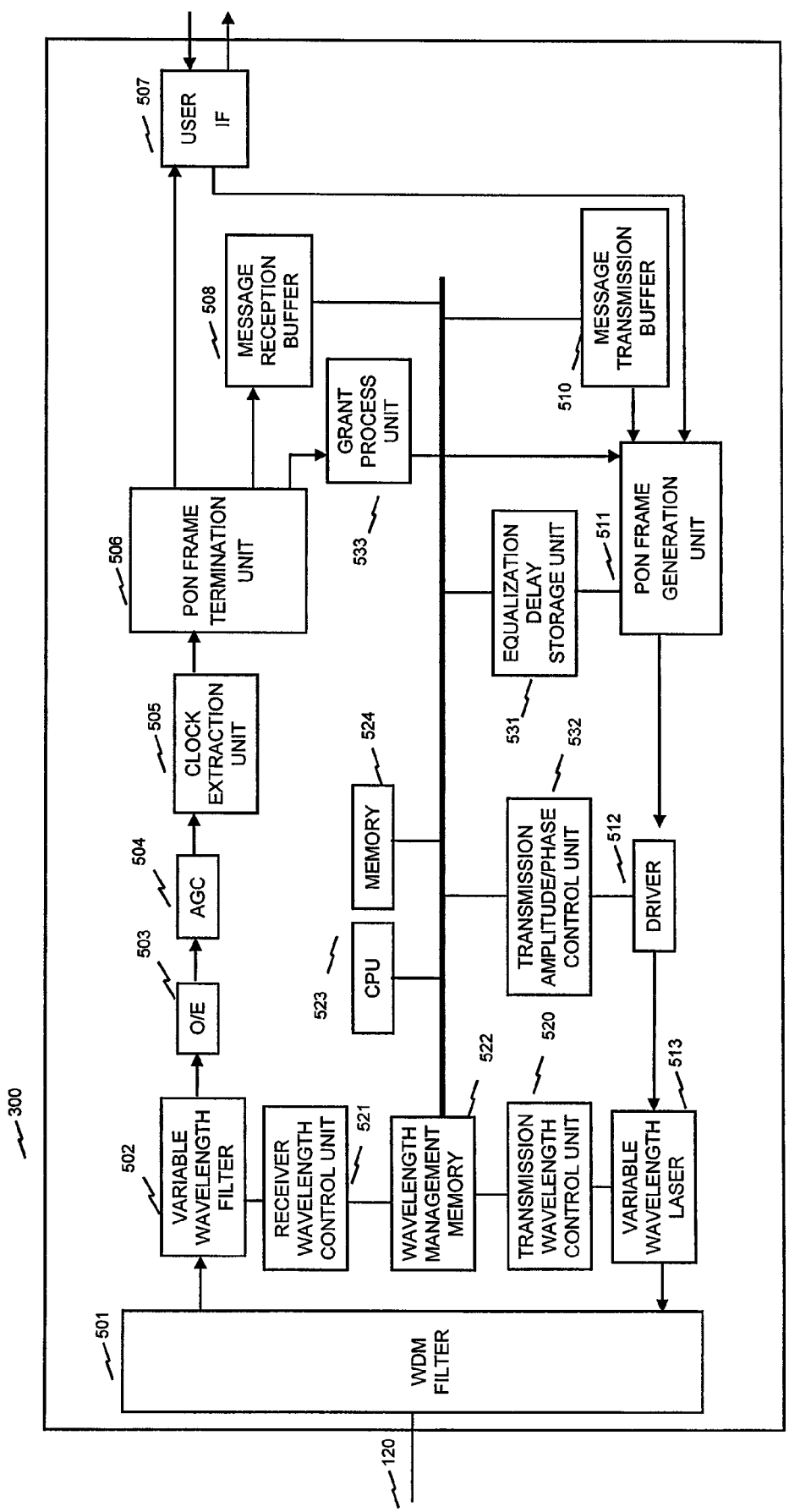
FIG. 6 is a first configurational diagram of an ONU in the invention.

FIG. 6 shows a first configurational example of the ONU 300 in this embodiment.

The ONU 300 includes, for example, a WDM filter 501, a variable wavelength filter 502, an O/E 503, an AGC (Automatic Gain Control) 504, a clock extraction unit 505, a PON frame termination unit 506, a user IF 507, a PON frame generation unit 511, a driver 512, a variable wavelength laser 513, a CPU (second control unit) 523, a memory 524, a wavelength management memory 522, a receiver wavelength control unit 521, a transmission wavelength control unit 520, a message reception buffer 508, a message transmission buffer 510, an equalization delay storage unit 531, a transmission amplitude/phase control unit 532, and a grant process unit 533.

An optical signal received from the branch line fiber 120 is subjected to wavelength demultiplexing by the WDM filter 501, and one of the downlink wavelengths λd1-λdm is selected and transmitted by the variable wavelength filter 502. The optical signal is converted into an electric signal by the O/E 503. A control is performed by the AGC (Automatic Gain Control) 504 so that an amplitude value may become constant. Retiming is done by the clock extraction unit 505, the overhead of a PON section is separated by the PON frame termination unit 506, and a user signal is sent to the user IF 507 and outputted therefrom.

Besides, a signal inputted from the user IF 507 is assembled by adding the overhead of the PON section in the PON frame generation unit 511. The assembled signal is converted into an optical signal by current-driving the variable wavelength laser 513 by the driver 512, and the optical signal is transmitted toward the branch line fiber 120 via the WDM filter 501.

The CPU 523 and the memory 524 perform the supervisory controls of the various units within the ONU 300, in a pair. By way of example, the CPU 523 sets predetermined wavelengths, for example, the downlink wavelength λd1 and the uplink wavelength λu1 as initial values in the wavelength management memory 522, immediately after the ONU has been activated or immediately after the ONU has been connected to the fiber. The receiver wavelength control unit 521 sets the wavelength of the variable wavelength filter 502 on the basis of values stored in the wavelength management memory 522, while the transmission wavelength control unit 520 sets the wavelength of the variable wavelength laser 513 on the basis of the values stored in the wavelength management memory 522. Besides, the CPU 523 exchanges a wavelength assignment message with the OLT 200 by employing the message reception buffer 508 and the message transmission buffer 510, so as to set the assignment wavelength of the ONU 300 itself in the wavelength management memory 522. Further, as described with reference to FIGS. 3 and 4, the ranging time message 312 indicated in ITU-T Recommendation G. 984. 3 is received by the message reception buffer 508. The CPU 523 accumulates the specified equalization delay 330 in the equalization delay storage unit 531. The equalization delay acts on the PON frame generation unit 511 so as to delay the transmission signal, and it adjusts the transmission signal as if the distance of the ONU 300 from the OLT 200 were 20 km, irrespective of the physical location position of the ONU 300. Besides, the transmission amplitude/phase control unit 532 acts on the driver 512 so as to finely adjust the amplitude and phase of the transmission signal, on the basis of an instruction from the OLT 200 as has been received by the message reception buffer 508. A grant separated by the PON frame termination unit 506 is processed by the grant process unit 533, and the PON frame generation unit 511 generates an uplink signal frame at a timing based on that value of the grant which has been given as an instruction from the OLT 200. The details of the grant are indicated in ITU-T Recommendation G. 984.3. Besides, the details of the adjustments of the amplitude and phase of the transmission signal will be described with reference to FIGS. 12 and 10 later.

By the way, in this embodiment, the PON frame generation unit 511, driver 512 and variable wavelength laser 513, for example, will be sometimes termed the "third transmitter". The third transmitter delays a signal on the basis of the equalization delay stored in the equalization delay storage unit, at the transmission wavelength to be set and transmits the delayed signal. Besides, the variable wavelength filter 502, O/E 503, AGC 504 and clock extraction unit 505, for example, will be sometimes termed the "third receiver". The third receiver receives a signal at the receiver wavelength to be set. The receiver wavelength control unit 521, transmission wavelength control unit 520 and wavelength management memory 522, for example, will be sometimes termed the "wavelength control unit".

Figure 11:
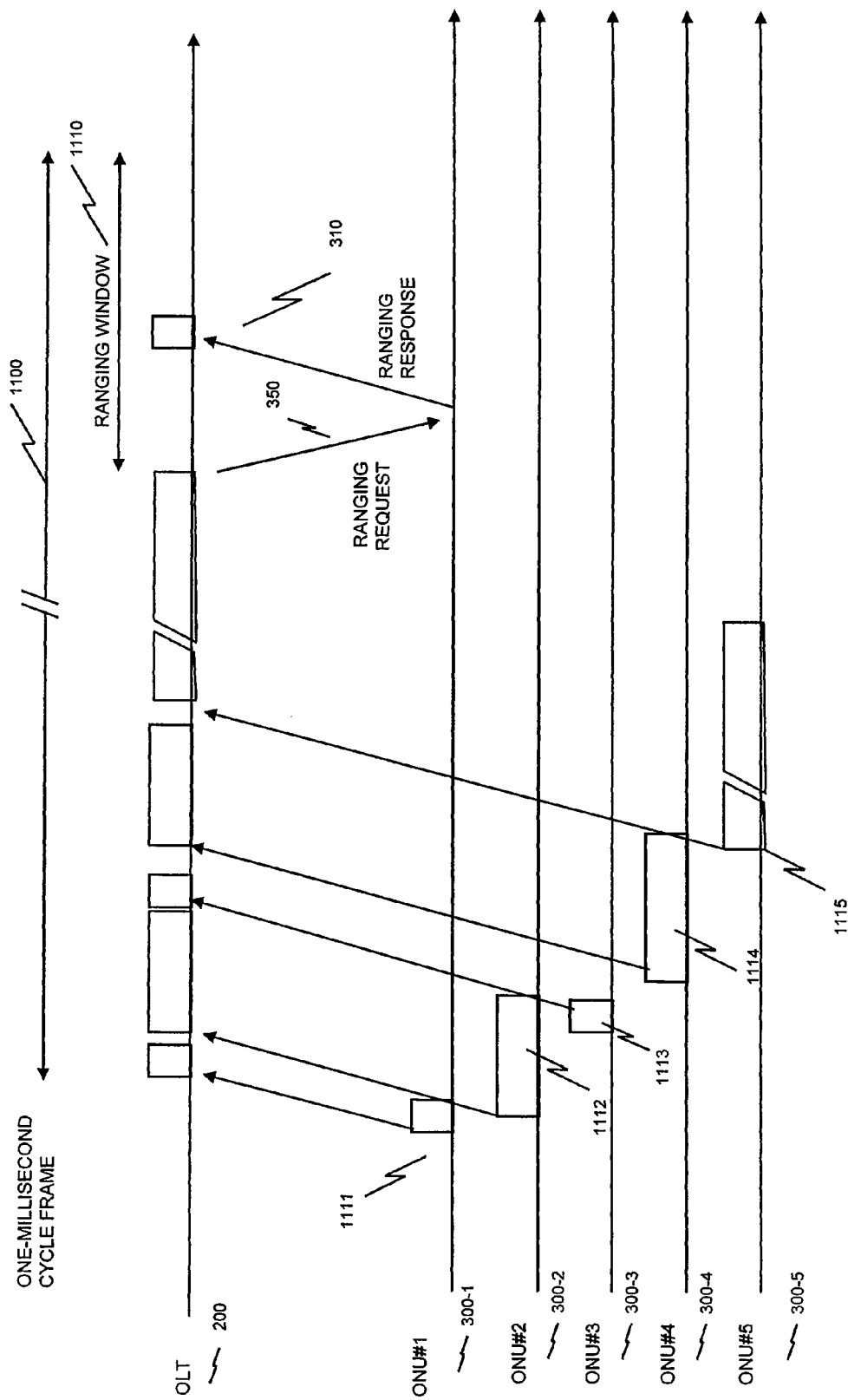
FIG. 11 is a diagram showing an example of a ranging operation sequence in a prior-art technique.

FIG. 11 shows an example of a ranging operation sequence in a prior-art technique.

In a bandwidth allocation cycle 1100 of, for example, one millisecond, the ONUs 300-1 through 300-5 transmit signals 1111 through 1115 toward the OLT 200, respectively. The transmission timings of the signals are given as instructions from the OLT 200 to the respective ONUs 300 by using the grant explained in the prior-art technique. Within the bandwidth allocation cycle 1100, a ranging window 1110 is the no-signal field (the field where communication data is nonexistent) which is used for the ranging explained in FIGS. 3 and 4. When the ONU 300-1 receives the ranging request 350, it immediately transmits the ranging response 310 toward the OLT 200. The OLT 200 measures a delay time involved since the transmission of the ranging request 350 till the reception of the ranging response 310, thereby to know how distant the ONU 300-1 is from the OLT 200. As explained in FIG. 4, the equalization delay 330 is thereafter set for the ONU 300 by the ranging time message 312 indicated in ITU-T Recommendation G. 984. 3. Thus, the transmission signal is adjusted as if the distance from the OLT 200 were 20 km, irrespective of the physical location position of the ONU 300. Incidentally, this part is omitted from FIG. 11.

If the distance between the OLT 200 and the ONU 300 is at most 20 km, at least 200 microseconds are required as the width of the ranging window 1110. If the width of the ranging window is 200 microseconds for the bandwidth allocation cycle of one second, a transmission bandwidth of 20% cannot be utilized for signal transfer. Incidentally, the cyclicality of a 125-microsecond frame is sometimes ensured as the width of the ranging window by employing 250 microseconds which are integral times 125 microseconds.

Figure 12:
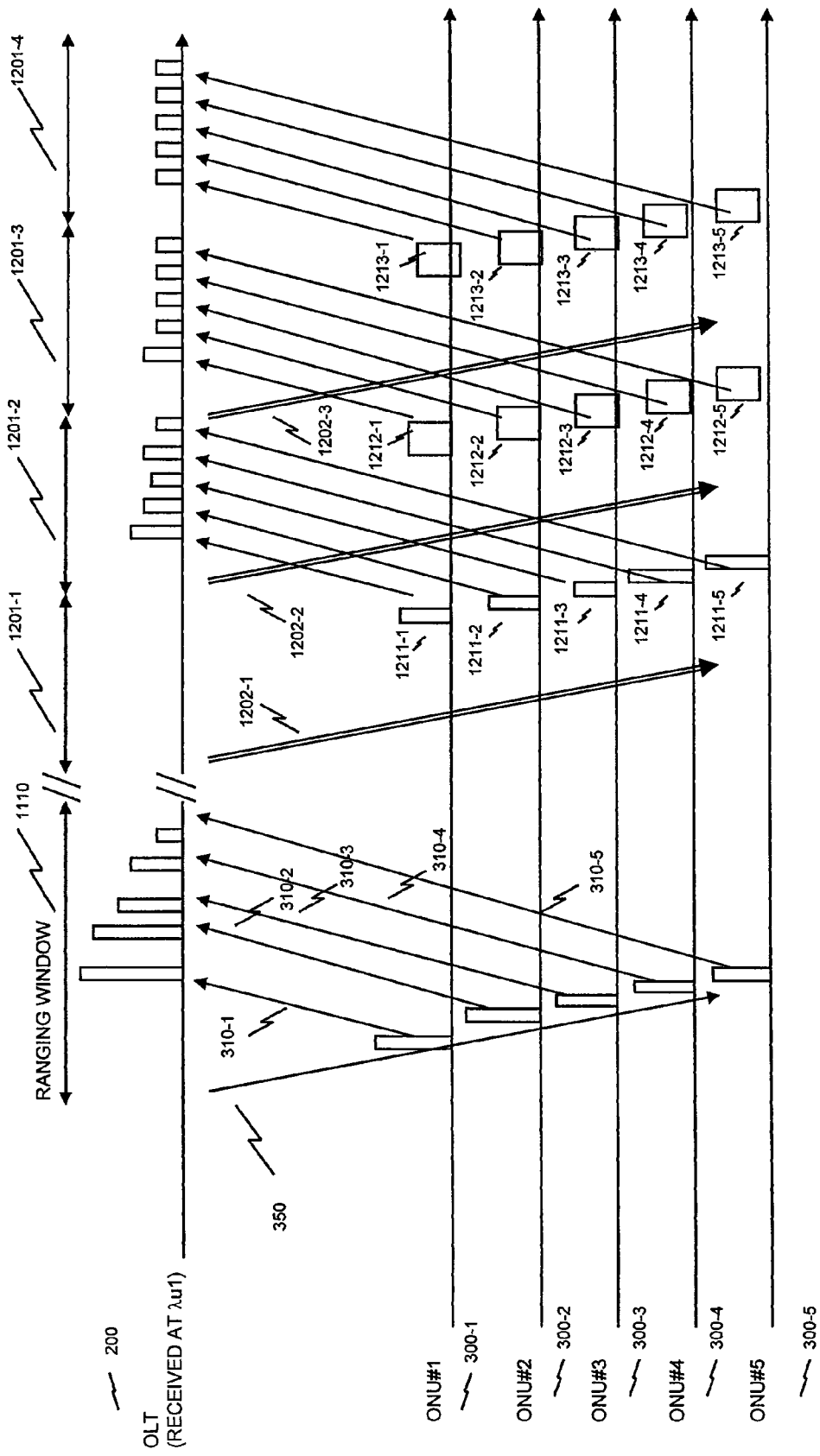
FIG. 12 is a diagram showing an example of a ranging operation sequence in the invention.

On the other hand, FIG. 12 shows an example of a ranging operation sequence in this embodiment.

In this embodiment, by way of example, the wavelength for the uplink signals, $\lambda u1$ can be occupied for the ranging use, but the field may well be further divided into a ranging window 1110 and 125-microsecond cycles 1201-1 through 1201-4. With this configuration, the amplitudes and phases of received signals from the ONUs 300-1 through 300-5 are first measured using a ranging request 350 and ranging responses 310-1 through 310-5 in the ranging window 1110. In addition, as explained in FIG. 11, an equalization delay 330 is thereafter set for the ONUs 300 by the ranging time message 312 indicated in ITU-T Recommendation G. 984. 3, whereby transmission signals are adjusted as if the distances of the ONUs 300 from the OLT 200 were 20 km, irrespective of the physical location positions of the ONUs 300. This part is also omitted from FIG. 12.

Subsequently, ONU transmission amplitude/phase control signals 1202 are transmitted to the individual ONUs 300 at intervals of 125 microseconds by using the 125-microsecond cycles 1201-1 through 1201-n. By the way, in the example of FIG. 12, each ONU transmission amplitude/phase control signal 1202 for the individual ONUs 300 is indicated by a single double line, but signals for the respective ONUs are transmitted. The details of this operation will be described later.

Figure 9:
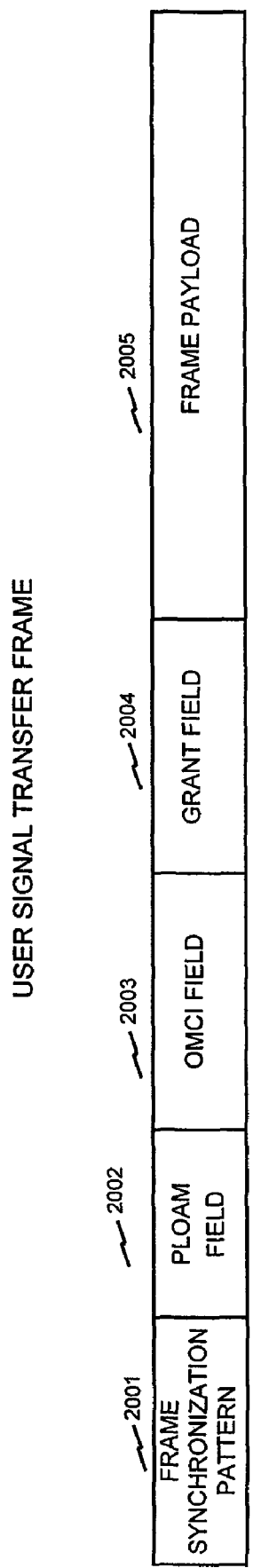
FIG. 9 is a format diagram of a user signal transfer frame in the invention.

FIG. 9 shows an example of the format of a signal transfer frame from the OLT to each ONU in this embodiment.

The signal transfer frame is transferred using, for example, any of downlink wavelengths $\lambda d1$-$\lambda d8$. A frame synchronization pattern 2001 is used for frame synchronization. A PLOAM (Physical Layer Operation Administration and Maintenance) field 2002 is a field which is used for the supervisory control of a physical layer, and a practicable example thereof is indicated in, for example, ITU-T Recommendation G. 984. 3. An OMCI (ONT Management and Control Interface) field 2003 is a field which can supervise and control the internal control information of the ONU, and a practicable example thereof is indicated in ITU-T Recommendation G. 984. 4 (Non-patent Document 4). A grant field 2004 is used for controlling the signal transmission timing of the ONU 300 in an uplink signal, and a practicable configuration thereof is incarnated by contents stated in Chapter 8 of ITU-T Recommendation G. 984. 3 or Chapter 64 of IEEE 802. 3 Standards. A frame payload 2005 is a field which conveys a user signal, and in which an Ethernet (registered trademark) signal, an ATM signal or the like user signal can be mapped.

Figure 10:
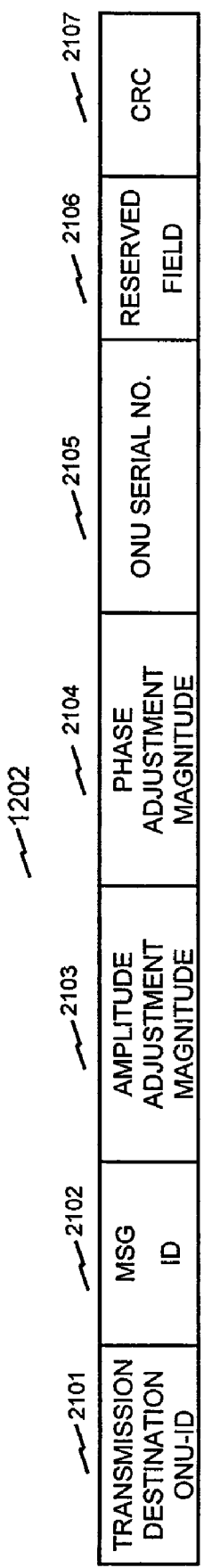
FIG. 10 is a format diagram of a wavelength request signal in the invention.

FIG. 10 shows an example of the ONU transmission amplitude/phase control signal 1202 in this embodiment.

The ONU transmission amplitude/phase control signal 1202 contains a transmission destination ONU-ID 2101, an MSG-ID (message ID) 2102, an amplitude adjustment magnitude 2103, a phase adjustment magnitude 2104, an ONU serial No. 2105, a reserved field 2106, and a CRC (Cyclic Redundancy Check) 2107.

The ID of the ONU to be controlled enters the transmission destination ONU-ID 2101. The MSG-ID 2102 is a classification code which indicates that the pertinent signal is the ONU transmission amplitude/phase control signal. The amplitude adjustment magnitude 2103 is formed of, for example, 7 bits, and it is used for an amplitude control whose granularity is 0.5 dB and whose control range is from +32 dB to −31.5 dB. By way of example, after the ONU 300 has received the amplitude adjustment magnitude of −31.5 dB, it must transmit an uplink signal by decreasing a transmission amplitude 31.5 dB (by subjecting the transmission amplitude to −31.5 dB). In a case where the amplitude has been lowered excessively, the OLT 200 transmits, for example, an amplitude adjustment magnitude of +0.5 dB by using the control signal, and the ONU 300 having received the control signal transmits an uplink signal by increasing the transmission amplitude +0.5 dB thenceforth. The transmission phase adjustment magnitude 2104 is formed of, for example, 5 bits, and it is used for a transmission phase control whose granularity is $\frac{1}{16}$ bit time and whose control range is from +15/16 to −16/16 (=−1) bit time. By way of example, after the ONU 300 has received the transmission phase adjustment magnitude of −$\frac{1}{16}$ bit time, it must transmit an uplink signal by retarding a transmission phase the $\frac{1}{16}$ bit time (by shifting the transmission phase −$\frac{1}{16}$ bit time). In a case where the phase has been retarded excessively, the OLT 200 transmits the transmission phase adjustment magnitude of, for example, +$\frac{1}{16}$ bit time by using the control signal, and the ONU 300 having received the control signal transmits an uplink signal by advancing the transmission phase +$\frac{1}{16}$ bit time thenceforth. Incidentally, the numbers of bits, granularities and control ranges of the amplitude adjustment magnitude 2103 and the transmission phase adjustment magnitude 2104 can be appropriately set otherwise than those of the above examples.

The transmission destination ONU-ID 2101, amplitude adjustment magnitude 2103 and transmission phase adjustment magnitude 2104 can use, for example, data which are stored in the received burst amplitude/phase management table 225 shown in FIGS. 8A-8D. Incidentally, regarding the amplitude adjustment magnitude 2103 and transmission phase adjustment magnitude 2104, it is also allowed to use magnitudes which are obtained by inverting the signs of the received amplitude deviation and received phase deviation stored in the received burst amplitude/phase management table 225.

The ONU serial No. 2105 is a No. which is peculiar to the ONU, and it is a code of 8 bytes in ITU-T Recommendation G. 983. 1. The reserved field 2106 is an empty field for uniformalizing the lengths of signals to the length of the PLOAM message already stipulated in ITU-T Recommendation G. 983. 1, and it can be used for an expanded use in the future. The CRC (Cyclic Redundancy Check) 2107 is bestowed for the OLT 200 to confirm the nonexistence of any error in message contents, and the OLT 200 does not use any message in which the error is existent. The control signal 1202 is transmitted to the ONU by using, for example, the downlink wavelength $\lambda d1$, in a state where it is stored in the PLOAM field 2002 within the format of the signal transfer frame explained in FIG. 9.

Here, the sequence in which the ONU transmission amplitude/phase control signal 1202 explained before is used will be described again with reference to FIGS. 12, 5, 6 and 8. In FIG. 12, the ranging request 350 is transmitted using the field of the ranging window 1110, and the amplitudes and phases of received signals from the individual ONUs 300-1 through 300-5 are respectively measured using the ranging responses 310-1 through 310-5. Incidentally, the description of the ranging process shall be omitted here.

The ranging responses 310-1 through 310-5 transmitted using the uplink wavelength $\lambda u1$ are converted into electric signals by the O/E 208-1 in FIG. 5, and the electric signals are received by the ATC 212 and burst clock extraction unit 213. Further, the deviations of the actual received signals from an expected received amplitude and an expected received phase are measured by the amplitude/phase deviation decision unit 214, and the contents of the deviations are sent to the uplink burst amplitude/phase management table 225 so as to be stored in correspondence with the ONU-IDs. In the received burst amplitude/phase management table (at the first time) in FIG. 8A, a value of +20 dB is measured as the received amplitude deviation at ONU-ID=1, and a value of +⅛ as the received phase deviation. The CPU 226 assembles the ONU transmission amplitude/phase control signal 1202-1 by setting the amplitude adjustment magnitude 2103 as −20 dB and the transmission phase adjustment magnitude 2104 as −⅛ on the basis of the measured received amplitude deviation and received phase deviation and also setting the transmission destination ONU-ID 2101 as "1", and it transmits the assembled control signal 1202-1 at the wavelength $\lambda d1$ by employing the message transmission buffer 222, PON frame generation unit 204-1, driver 205-1 and E/O 206-1.

The ONU 300-1 subjects the optical signal of the downlink wavelength $\lambda d1$ to wavelength demultiplexing by the WDM filter 501 in FIG. 6. This ONU 300-1 which selects and transmits the optical signal by the variable wavelength filter 502 set at the downlink wavelength $\lambda d1$ converts the optical signal into an electric signal by the O/E 503, and it controls the electric signal by the AGC (Automatic Gain Control) 504 so that the amplitude value thereof may become constant. Subsequently, the ONU 300-1 performs retiming by the clock extraction unit 505, and it separates the ONU transmission amplitude/phase control signal 1202-1 by the PON frame termination unit 506 so as to store the separated control signal in the message reception buffer 508. Incidentally, the other ONUs 300-2 through 300-$n$ neglect the control signal 1201-1 because it is not destined for themselves. The CPU 523 sets the amplitude adjustment magnitude −20 dB and transmission phase adjustment magnitude −⅛ indicated by the received ONU transmission amplitude/phase control signal 1202-1, in the transmission amplitude/phase control unit 532. The ONU 300-1 transmits the uplink signal 1211-1 in FIG. 12 by adjusting the amplitude and phase thereof with the adjustment magnitudes set in the transmission amplitude/phase control unit 532.

The uplink signal 1211-1 is received by the OLT 200, and similar processing is repeated. By way of example, the uplink signal 1211-1 is converted into an electric signal by the O/E 208-1 in FIG. 5 again, and the electric signal is received by the ATC 212 and burst clock extraction unit 213. Further, the deviations of the actual received signal from the expected received amplitude and received phase are measured by the amplitude/phase deviation decision unit 214, and the contents of the deviations are sent to the uplink burst amplitude/phase management table 225. In the received burst amplitude/phase management table (at the second time) in FIG. 8B, a value of +4 dB is measured as the received amplitude deviation at the ONU-ID=1, and a value of +⅛ as the received phase deviation.

The received signal is not accurately adjusted to the amplitude adjustment magnitude and the transmission phase adjustment magnitude on account of, for example, measurement errors in the amplitude/phase deviation decision unit 214 in FIG. 5, the circuit setting errors of the transmission amplitude/phase control unit 532 in FIG. 6, and errors ascribable to noise and minute temporal fluctuations in the transmission lines. Accordingly, the CPU 226 assembles the ONU transmission amplitude/phase control signal 1202-2 (which may well be at the timing 1202-3 or the like) by setting an amplitude adjustment magnitude −4 dB and the transmission phase adjustment −⅛, and it transmits the assembled control signal again similarly to the above. As in the foregoing, the ONU 300-1 receives the ONU transmission amplitude/phase control signal 1202-2, and the CPU 523 sets the amplitude adjustment magnitude −4 dB and transmission phase adjustment −⅛ indicated by the received ONU transmission amplitude/phase control signal 1202-2, in the transmission amplitude/phase control unit 532, so as to transmit the uplink signal 1212-1 (which may well be the signal 1213-1 or the like) in FIG. 12.

The uplink signal 1212-1 is received again as stated above, the deviations of the actual received signal from the expected received amplitude and received phase are measured by the amplitude/phase deviation decision unit 214, and the contents of the deviations are sent to the uplink burst amplitude/phase management table 225. In the received burst amplitude/phase management table (at the third time) in FIG. 8C, a value of +1 dB is measured as the received amplitude deviation at the ONU-ID=1, and a value of 0 as the received phase deviation. The CPU 226 assembles the ONU transmission amplitude/phase control signal 1202-3 by setting an amplitude adjustment magnitude −1 dB and a transmission phase adjustment magnitude 0, and it transmits the assembled control signal again as in the foregoing. The ONU 300-1 receives the ONU transmission amplitude/phase control signal 1202-3 as in the foregoing, and the CPU 523 sets the amplitude adjustment magnitude −1 dB and transmission phase adjustment magnitude 0 indicated by the received ONU transmission amplitude/phase control signal 1202-3, in the transmission amplitude/phase control unit 532, so as to transmit the uplink signal 1213-1 in FIG. 12.

The uplink signal 1213-1 is received again as stated above, the deviations of the actual received signal from the expected received amplitude and received phase are measured by the amplitude/phase deviation decision unit 214, and the contents of the deviations are sent to the uplink burst amplitude/phase management table 225. In the received burst amplitude/phase management table (at the final time) in FIG. 8D, a value of 0 dB is measured as the received amplitude deviation at the ONU-ID=1, and a value of 0 as the received phase deviation. Then, the amplitude/phase adjustments are completed.

In the above, the amplitude/phase adjustments of the ONU-ID=1 have been described in detail, and similar operations are carried out in time division for ONU-IDs=2 through 5. That is, also the control signals which use the format of FIG. 10 and whose transmission destinations 2101 are the ONUs 300-2 through 300-5 (ONU-IDs=2 through 5) are time-division-multiplexed in the ONU transmission amplitude/phase control signals 1202-1 through 1202-3 in FIG. 12 and are transmitted.

Owing to these processes, the signals from the respective ONUs 300 have the received amplitude deviations and received phase deviations decreased, and the amplitudes and phases of the received signals in the OLT 200 are equalized as in the cycle 1201-4 in FIG. 12.

Figure 13:
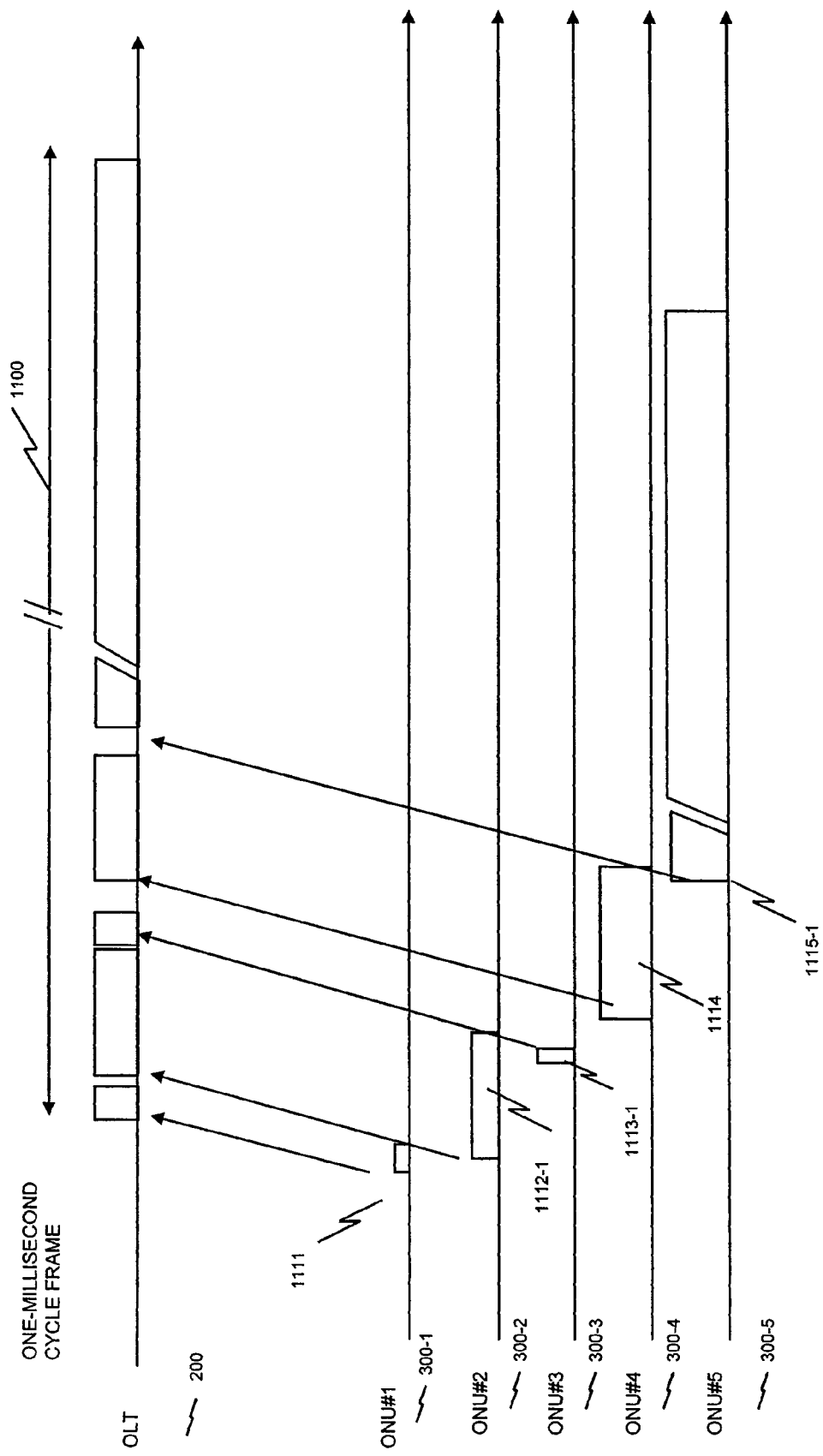
FIG. 13 is a diagram showing an example of an ordinary signal transfer sequence in the invention.

FIG. 13 shows the transfer sequence of ordinary signals in this embodiment.

The sequence shown in FIG. 13 is a sequence in the case where the uplink ordinary signals (communication data) 1111 through 1115 subjected to the ranging process and the transmission amplitudes and phase adjustments of the respective ONUs explained in FIG. 12 are transferred. Any of the wavelengths $\lambda u2$ through $\lambda u4$ except the wavelength $\lambda u1$ is used as an uplink communication wavelength. The transmission amplitudes and phases from the ONUs 300 are different, and the ordinary signals are results obtained by controlling the transmission amplitudes and phases so as to agree with the received amplitude and received phase expected when the ordinary signals are received by the OLT 200. Accordingly, in the case where the ordinary signals are received by the OLT 200, neither of the ATC 212 and the burst clock extraction unit 213 for the burst signal reception needs to be used. The ordinary signals are received and processed by the O/Es 208-2 through 208-n, fixed-gain amplifiers 209-2 through 209-n, fixed-phase retiming units 210-2 through 210-n, and PON frame decomposition units 211-2 through 211-n. Besides, the ranging window 1110 is unnecessary at the ordinary signal transferring wavelengths $\lambda u2$ through $\lambda u4$, so that transfer bandwidths are not wasted.

Besides, regarding the amplitude/phase adjustment operations described in this embodiment, it is possible to adopt either of a method in which the operations are performed only at the activations of the ONUs 300, and a method in which they are cyclically performed under the activations of the ONUs 300.

Figure 7:
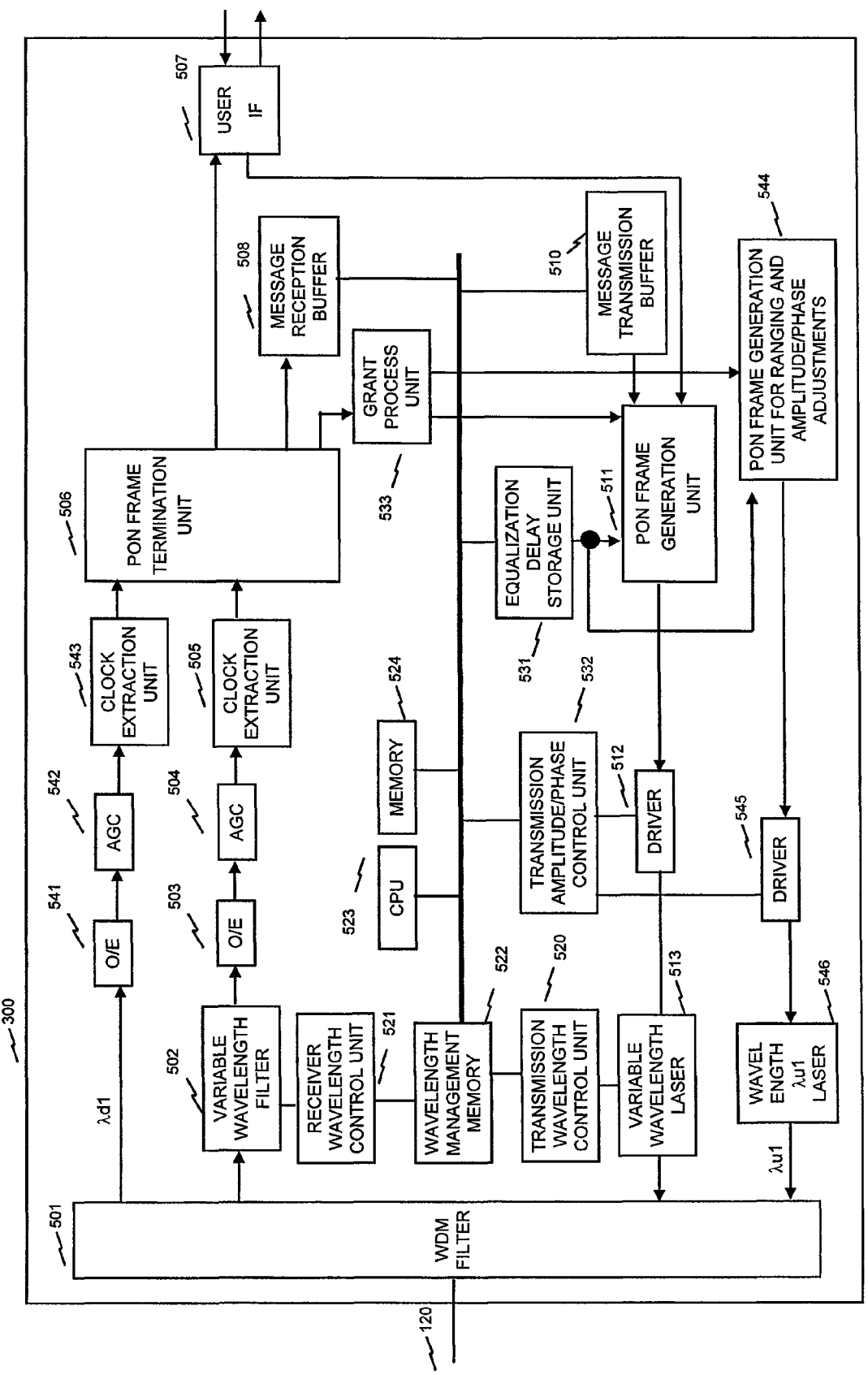
FIG. 7 is a second configurational diagram of an ONU in the invention.

FIG. 7 shows a second configurational example of the ONU in this embodiment. The configuration of FIG. 7 is applied in a case where amplitude/phase adjustment operations are cyclically performed even under the activations of the ONUs 300. Points of difference from the configuration of FIG. 6 are that a WDM filter 501 has the function of separately demultiplexing a wavelength $\lambda d1$ and other wavelengths as downlink communication wavelengths, that a second O/E 541, a second AGC (Automatic Gain Control) 542, a second clock extraction unit 543, a PON frame generation unit for ranging and amplitude/phase controls, 544, a second driver 545, and a wavelength $\lambda u1$ laser 546 are further included, and that the WDM filter 501 has the function of multiplexing an uplink wavelength $\lambda u1$ and other uplink wavelengths. A control message 1202 for distance measurement and amplitude/phase adjustments as is received at the downlink communication wavelength $\lambda d1$ is converted into an electric signal by the O/E 541, the amplitude of the electric signal is adjusted by the AGC 542, the adjusted signal is retimed by the clock extraction unit 543, and the overhead of a PON section is separated by a PON frame termination unit 506.

Thenceforth, as described in the foregoing example, an equalization delay 330 indicated by message reception is accumulated in an equalization delay storage unit 531, and the PON frame generation unit for the ranging and the amplitude/phase controls, 544 is operated to delay a transmission signal, whereby the transmission signal is adjusted as if the distance of the ONU 300 from the OLT 200 were 20 km, irrespective of the physical location position of the ONU 300. The assembled signal is converted into an optical signal by current-driving the wavelength $\lambda u1$ laser 546 with the driver 545, and the optical signal is transmitted toward a branch line fiber 120 via the WDM filter 501.

Besides, a transmission amplitude/phase control unit 532 operates both a driver 512 and the driver 545 so as to finely adjust the amplitude and phase of the transmission signal, on the basis of an instruction from the OLT 200 as has been received by a message reception buffer 508. Detailed operations for finely adjusting the amplitude and phase of the transmission signal are also the same as described in the foregoing example. When an ordinary signal is transferred upon the completions of the ranging and the amplitude/phase controls, a wavelength which is used by a variable wavelength filter 502 is selected and transmitted for a downlink signal. The optical signal is converted into an electric signal by an O/E 503, the electric signal is controlled by an AGC 504 so that the amplitude value may become constant, the controlled signal is retimed by a clock extraction unit 505, the overhead of the PON section is separated by the PON frame termination unit 506, and a user signal is sent to and outputted from a user IF 507. Besides, a signal inputted from the user IF 507 is assembled by adding the overhead of the PON section in a PON frame generation unit 511. The assembled signal is converted into an optical signal by current-driving a variable wavelength laser 513 with the driver 512, and the optical signal is transmitted toward the branch line fiber 120 via the WDM filter 501.

A CPU 523 exchanges a wavelength assignment message with the OLT 200 by employing the message reception buffer 508 and a message transmission buffer 510, so as to set the assignment wavelength of the ONU 300 itself in a wavelength management memory 522. A receiver wavelength control unit 521 sets any of the downlink wavelengths $\lambda d2$ through $\lambda d8$ as the wavelength of the variable wavelength filter 502 on the basis of the value stored in the wavelength management memory 522, and a transmission wavelength control unit 520 sets the value of any of the wavelengths $\lambda u2$ through $\lambda u4$ stored in the wavelength management memory 522, as the wavelength of the variable wavelength laser 513.

By the way, in this embodiment, the PON frame generation unit for the ranging and the amplitude/phase controls, 544, the driver 545 and the wavelength $\lambda u1$ laser 546, for example, will be sometimes termed the "fourth transmitter". The fourth transmitter delays the signal on the basis of the equalization delay stored in the equalization delay storage unit 531, and transmits the signal to-be-transmitted at the first wavelength ($\lambda u1$). Besides, the O/E 541, AGC 542 and clock extraction unit 543, for example, will be sometimes termed the "fourth receiver". The fourth receiver receives the signal at the first wavelength ($\lambda u1$).

The advantages of this embodiment will be described with reference to FIGS. 14 and 15.

Figure 14:
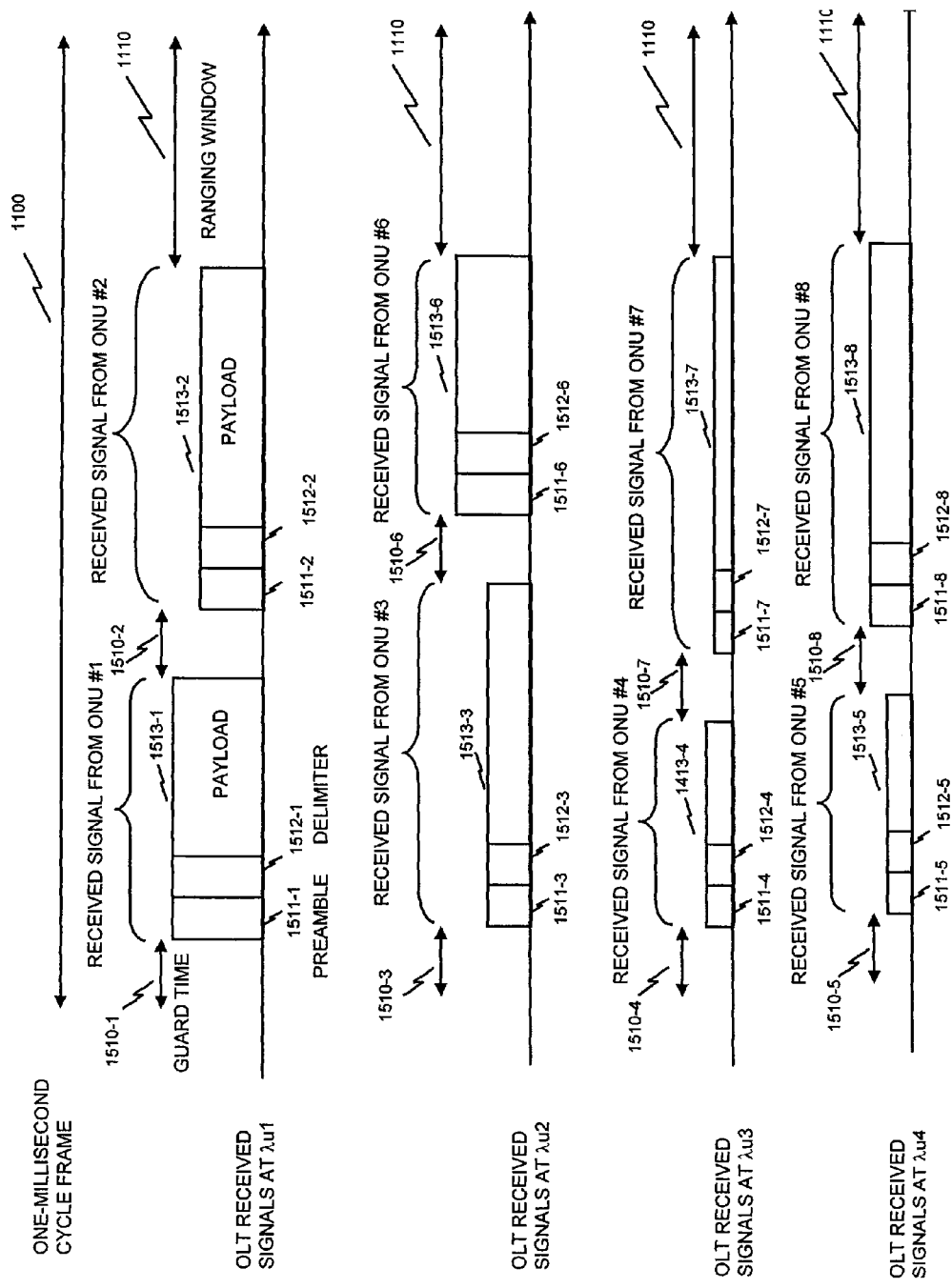
FIG. 14 is a model diagram of an uplink transfer method in a prior-art technique.

FIG. 14 is a model diagram of uplink signal transfer in a prior-art technique.

An uplink signal contains a ranging window 1110, guard times 1510, preambles 1511, delimiters 1512 and payloads 1513 within a one-millisecond cycle frame 1100. The guard time 1510 is a no-signal field which is provided so as to prevent the occurrence of the collision of signals even when phase fluctuations have appeared in uplink burst signals from different ONUs. The preamble 1511 is a fixed pattern which is provided in order that the OLT 200 may perform a reception threshold value adjustment and clock extraction at high speed from the uplink burst signal. The delimiter 1512 is a fixed pattern which indicates the start position of the uplink burst signal. The payload 1513 is a field for transferring a user signal and a control signal. The details of the guard time 1510, preamble 1511, delimiter 1512 and payload 1513 are indicated in ITU-T Recommendations G. 984. 2 and G. 984. 3.

In FIG. 14, uplink signals from the ONU #1 and ONU #2 are transferred at an uplink wavelength $\lambda u1$, uplink signals from the ONU #3 and ONU #6 are transferred at an uplink wavelength $\lambda u2$, uplink signals from the ONU #4 and ONU #7 are transferred at an uplink wavelength $\lambda u3$, and uplink signals from the ONU #5 and ONU #8 are transferred at an uplink wavelength $\lambda u4$. The ranging windows 1110 are respectively assigned to the four wavelengths, and this forms a factor for lowering the overall transfer efficiency. Besides, the fiber length between the OLT 200 and the ONU 300 differs every ONU, so that the received amplitudes of the signals from the different ONUs differ. Accordingly, the preambles 1511 each of which serves for the OLT 200 to perform the reception threshold value adjustment and the clock extraction at the high speed are indispensable, and this forms a factor for further lowering the transfer efficiency.

Figure 15:
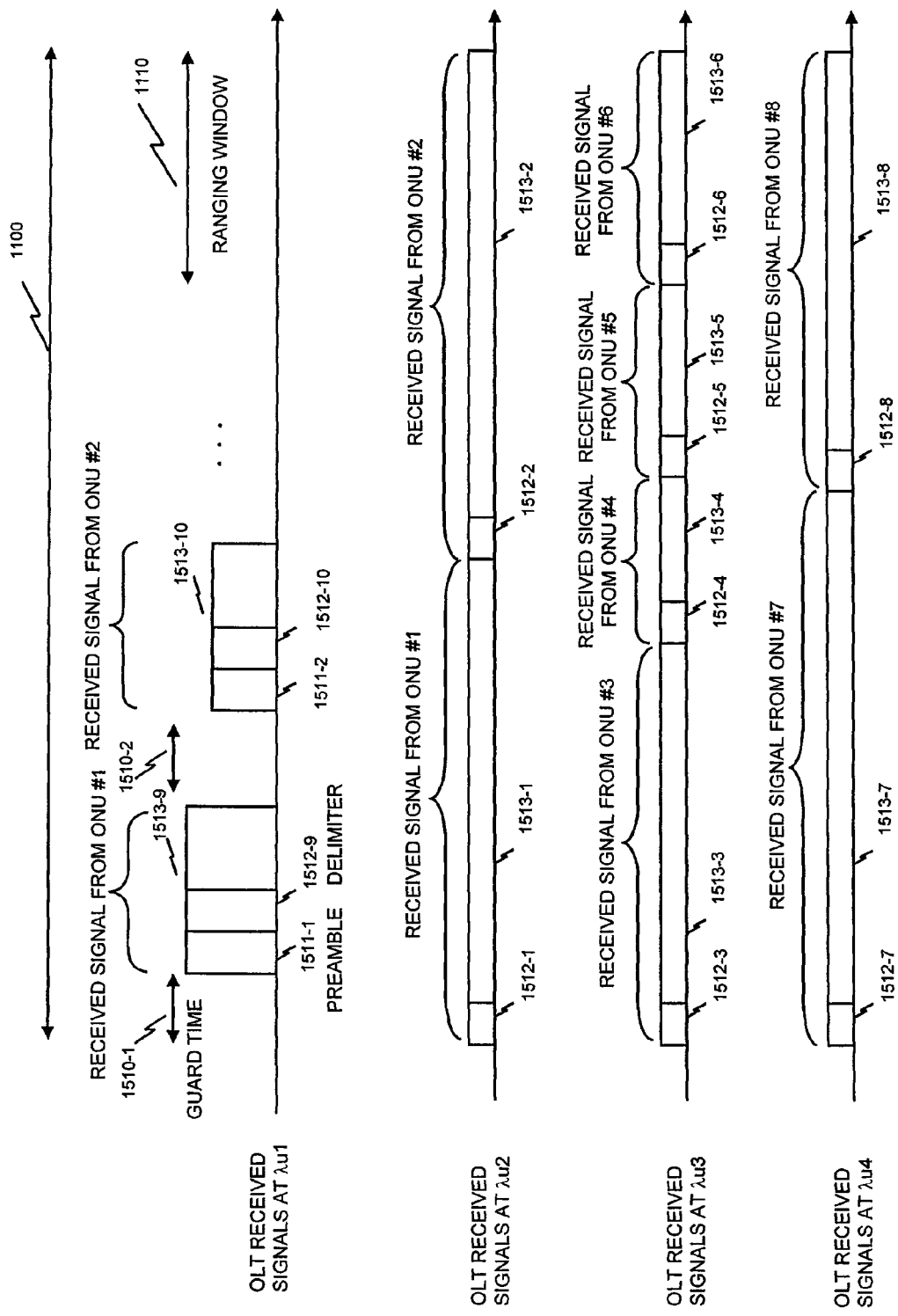
FIG. 15 is a model diagram of an uplink transfer method in the invention.

FIG. 15 is a model diagram of an uplink transfer method in this embodiment.

An uplink wavelength $\lambda u1$ is a wavelength which is used for only ranging and amplitude/phase adjustments, so that the amplitude/phase adjustments can be always made using preambles 1511, delimiters 1512 and payloads 1513 from ONUs 300 under activations. At uplink wavelengths $\lambda u2$ through $\lambda u4$, as already explained, the received amplitudes and phases of signals from the different ONUs 300 have been adjusted so as to become constant values by amplitude/phase adjustments, so that guard times 1510 and the preambles 1511 become unnecessary. In FIG. 15, the uplink signals from the ONU #1 and ONU #2 are transferred at the uplink wavelength $\lambda u2$, the uplink signals from the ONU #3, ONU #4, ONU #5 and ONU #6 are transferred at the uplink wavelength $\lambda u3$, and the uplink signals from the ONU #7 and ONU #8 are transferred at the uplink wavelength $\lambda u4$. A ranging window 1110, the guard time 1510 and the preamble 1511 are unnecessary for each of the uplink wavelengths $\lambda u2$ through $\lambda u4$, and a high transfer efficiency is attained at each of the wavelengths $\lambda u2$ through $\lambda u4$.

Figure 16:
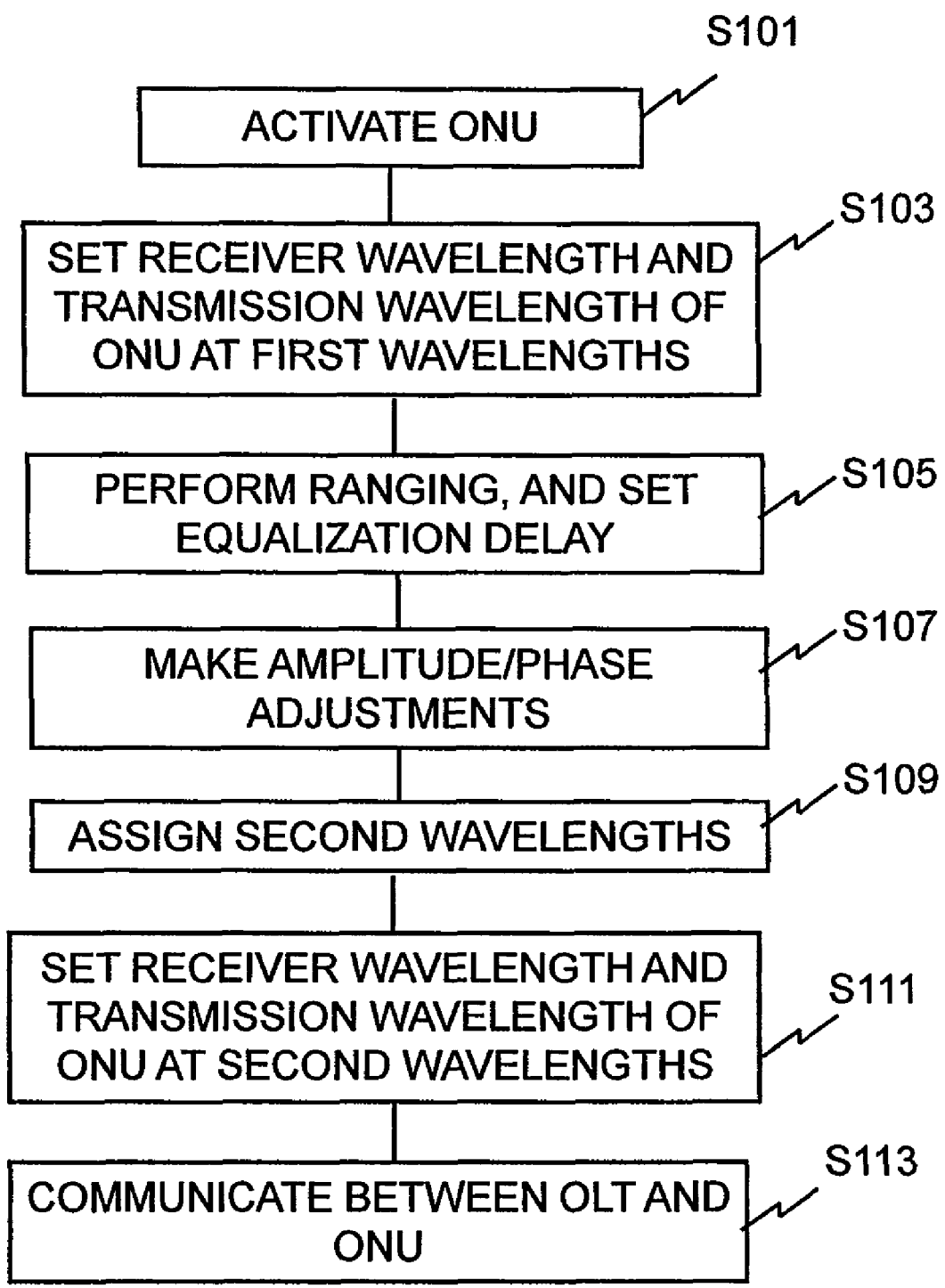
FIG. 16 is a schematic diagram of operations from ONU activation to communications.

FIG. 16 is a schematic diagram of operations from ONU activation to communications. Incidentally, the details of the respective operations are as stated above.

First, when an ONU 300 is activated (S101), the wavelength control unit of the ONU 300 sets a transmission wavelength and a receiver wavelength at first wavelengths ($\lambda u1$, $\lambda d1$) (S103). An OLT 200 and the ONU 300 perform a ranging process with the first wavelengths, and an equalization delay is set in the ONU 300 (S105). By way of example, the OLT 200 performs the ranging process with the optical network units by using the first wavelengths, and it gives each ONU 300 the instruction of the equalization delay for delaying and transmitting a signal in each ONU 300, in order to make the OLT 200 and the plurality of ONUs 300 equally distant. The ONU 300 stores the equalization delay given as the instruction by the OLT 200.

The OLT 200 and the ONU 300 execute processing for setting an amplitude adjustment magnitude and a phase adjustment magnitude as stated before, by using the first wavelengths (S107). By way of example, the OLT 200 evaluates the amplitude deviation between the amplitude of a signal from the ONU 300 as is received at the first wavelength and a desired amplitude, and the phase deviation between the phase of the signal and a desired phase. The OLT 200 transmits to the ONU 300, an amplitude/phase control signal which contains the amplitude adjustment magnitude and the phase adjustment magnitude that are set so as to cancel the evaluated amplitude deviation and phase deviation. The ONU 300 adjusts the amplitude and phase of a signal to be outputted to the OLT 200, in accordance with the amplitude adjustment magnitude and phase adjustment magnitude contained in the amplitude/phase control signal, and it outputs the adjusted signal.

Besides, second wavelengths for the communications are assigned to the ONU 300 at an appropriate timing (S109). The wavelength control unit of the ONU 300 sets a transmission wavelength and a receiver wavelength at the second wavelengths (S111). The OLT 200 and the ONU 300 communicate at the second wavelengths (S113).

The present invention is applicable to, for example, a GPON which conforms to ITU-T Recommendation G. 984. 3. Besides, the invention is applicable to another PON system, for example, an Ethernet (registered trademark) PON system which is stipulated in Chapter 64 of IEEE 802. 3 Standard.

What is claimed is:

1. A passive optical network system including an optical line termination device, an optical splitter, and a plurality of optical network units which are connected to the optical line termination device through optical fibers and the optical splitter, wherein the optical line termination device and the optical network units communicate in wavelength division multiplexing and in time division multiplexing of individual wavelengths;

wherein:

the passive optical network system has a first wavelength at which signals for performing predetermined ranging process between the optical line termination device and the optical network units are transmitted and received, and a plurality of second wavelengths at which the optical line termination device and the optical network units communicate;

the optical line termination device performs the ranging process with respect to the optical network units by using the first wavelength, so as to give the individual optical network units instructions of an equalization delay for causing the respective optical network units to delay and transmit signals, in order that the optical line termination device itself and the plurality of optical network units may seem to be equally distant, and the optical line termination device communicates with the optical network units by using the second wavelengths; and each of the optical network units comprises:

an equalization delay storage unit in which the equalization delay given by the optical line termination device is stored;

a receiver which receives the signal at the set receiver wavelength;

a transmitter which transmits the signal at the set transmission wavelength by being delayed on the basis of the equalization delay stored in said equalization delay storage unit; and a wavelength control unit which sets the transmission wavelength of said transmitter and the receiver wavelength of said receiver at the first wavelength, so as to transmit and receive the signals for the ranging process, and which sets the transmission wavelength of said transmitter and the receiver wavelength of said receiver at an assigned one of the second wavelengths after the ranging process, so as to communicate with the optical line termination device.

2. A passive optical network system as defined in claim 1, wherein:

the optical line termination device further comprises:

an amplitude/phase management field in which evaluated amplitude deviations and phase deviations are stored in correspondence with identifiers of the optical network units; and an amplitude/phase deviation decision unit which evaluates the amplitude deviations between amplitudes of the signals from the optical network units as are received at the first wavelength and a desired amplitude and the phase deviations between phases of the signals and a desired phase, so as to store the evaluated amplitude deviations and phase deviations in said amplitude/phase management field;

further wherein:

the optical line termination device transmits to the optical network units, amplitude/phase control signal which contain amplitude adjustment magnitude and phase adjustment magnitude that are set so as to cancel the amplitude deviations and the phase deviations stored in said amplitude/phase management field; and the optical network unit further comprises a transmission amplitude/phase control unit in which the amplitude adjustment magnitude and the phase adjustment magnitude which are contained in the corresponding amplitude/phase control signal are set, and which adjusts an amplitude and a phase of the signal that is to be outputted to the optical line termination device by said transmitter, in accordance with the amplitude adjustment magnitude and the phase adjustment magnitude.

3. A passive optical network system as defined in claim 2, wherein:

the optical line termination device further comprises:
  a filter which discriminates the received signals, on the basis of the wavelengths;
  a first receiver which receives the signal for performing the ranging process, at the first wavelength; and
  a plurality of second receivers which receive the signals for communicating with the plurality of optical network units, at the plurality of second wavelengths;

said first receiver comprises a burst receiver circuit; and each of said second receivers comprises:
  a fixed-gain amplifier which amplifies the signal of the second wavelength discriminated by said filter, at a predetermined fixed gain; and
  a fixed-phase retiming unit which retimes the signal of the second wavelength discriminated by said filter, at a predetermined fixed phase.

4. A passive optical network system as defined in claim 1, wherein:

said wavelength control unit of the optical network unit sets the transmission wavelength of said transmitter and the receiver wavelength of said receiver at the predetermined first wavelength when the optical network unit itself is activated; and the ranging process is executed at the first wavelength when the optical network unit is activated.

5. A passive optical network system as defined in claim 1, wherein as each of the first wavelength and the second wavelengths, different wavelengths are used between in an uplink and in a downlink.

6. A passive optical network system including an optical line termination device, an optical splitter, and a plurality of optical network units which are connected to the optical line termination device through optical fibers and the optical splitter, wherein the optical line termination device and the optical network units communicate in wavelength division multiplexing and in time division multiplexing of individual wavelengths;

wherein:

the passive optical network system has a first wavelength at which signals for performing predetermined ranging process between the optical line termination device and the optical network units are transmitted and received, and a plurality of second wavelengths at which the optical line termination device and the optical network units communicate;

the optical line termination device performs the ranging process with respect to the optical network units by using the first wavelength, so as to give the individual optical network units instructions of an equalization delay for causing the respective optical network units to delay and transmit signals, in order that the optical line termination device itself and the plurality of optical network units may seem to be equally distant, and the optical line termination device communicates with the optical network units by using the second wavelengths;

each of the optical network units comprises:
  an equalization delay storage unit in which the equalization delay given by the optical line termination device is stored;
  a third receiver which receives the signal at the set receiver wavelength;
  a third transmitter which transmits the signal at the set transmission wavelength by being delayed on the basis of the equalization delay stored in said equalization delay storage unit;
  a fourth receiver which receives the signal at the first wavelength;
  a fourth transmitter which transmits the signal at the first wavelength by being delayed on the basis of the equalization delay stored in said equalization delay storage unit; and
  a wavelength control unit which sets the transmission wavelength of said third transmitter and the receiver wavelength of said third receiver at an assigned one of the second wavelengths, so as to communicate with the optical line termination device; and each of the optical network units transmits and receives, at the first wavelength, the signals for the ranging process, and/or an amplitude/phase control signal for adjusting an amplitude and a phase of the signal to be outputted to the optical line termination device, concurrently with the communication with the optical line termination device at the second wavelength.

7. A passive optical network system as defined in claim 6, wherein:

the optical line termination device further comprises:
  an amplitude/phase management field in which evaluated amplitude deviations and phase deviations are stored in correspondence with identifiers of the optical network units; and
  an amplitude/phase deviation decision unit which evaluates the amplitude deviations between amplitudes of the signals from the optical network units as are received at the first wavelength and a desired amplitude and the phase deviations between phases of the signals and a desired phase, so as to store the evaluated amplitude deviations and phase deviations in said amplitude/phase management field;

further wherein:

the optical line termination device transmits to the optical network units, amplitude/phase control signal which contain amplitude adjustment magnitude and phase adjustment magnitude that are set so as to cancel the amplitude deviations and the phase deviations stored in said amplitude/phase management field; and the optical network unit further comprises a transmission amplitude/phase control unit in which the amplitude adjustment magnitude and the phase adjustment magnitude which are contained in the corresponding amplitude/phase control signal are set, and which adjusts an amplitude and a phase of the signal that is to be outputted to the optical line termination device by said transmitter, in accordance with the amplitude adjustment magnitude and the phase adjustment magnitude.

8. A passive optical network system as defined in claim 7, wherein:
the optical line termination device further comprises:
a filter which discriminates the received signals, on the basis of the wavelengths;
a first receiver which receives the signal for performing the ranging process, at the first wavelength; and
a plurality of second receivers which receive the signals for communicating with the plurality of optical network units, at the plurality of second wavelengths;
said first receiver comprises a burst receiver circuit; and
each of said second receivers comprises:
a fixed-gain amplifier which amplifies the signal of the second wavelength discriminated by said filter, at a predetermined fixed gain; and
a fixed-phase retiming unit which retimes the signal of the second wavelength discriminated by said filter, at a predetermined fixed phase.

9. A passive optical network system as defined in claim 6, wherein as each of the first wavelength and the second wavelengths, different wavelengths are used between in an uplink and in a downlink.

10. A ranging method in a passive optical network system including an optical line termination device, an optical splitter, and a plurality of optical network units which are connected to the optical line termination device through optical fibers and the optical splitter, wherein the optical line termination device and the optical network units communicate in wavelength division multiplexing and in time division multiplexing of individual wavelengths;
the system having a first wavelength at which signals for performing predetermined ranging process between the optical line termination device and the optical network units are transmitted and received, and a plurality of second wavelengths at which the optical line termination device and the optical network units communicate;
the method comprising the steps of:
allowing the optical line termination device to perform the ranging process with respect to the optical network units by using the first wavelength, so as to give the individual optical network units instructions of an equalization delay for causing the respective optical network units to delay and transmit signals, in order that the optical line termination device and the plurality of optical network units may seem to be equally distant, and allowing the optical line termination device to communicate with the optical network units by using the second wavelengths; and
allowing each of the optical network units:
to store the equalization delay given by the optical line termination device, and to transmit the signal to be outputted to the optical line termination device, with a delay based on the equalization delay;
to set a transmission wavelength and a receiver wavelength at the first wavelength, and to transmit and receive the signals for the ranging process; and
to set a transmission wavelength and a receiver wavelength at an assigned one of the second wavelengths after the ranging process, and to communicate with the optical line termination device.

11. A ranging method as defined in claim 10, further comprising the steps of:
allowing the optical line termination device:
to evaluate an amplitude deviation between an amplitude of the signal from each of the optical network unit as is received at the first wavelength and a desired amplitude, and a phase deviation between a phase of the signal and a desired phase; and
to transmit to the optical network unit, an amplitude/phase control signal which contains an amplitude adjustment magnitude and a phase adjustment magnitude that are set so as to cancel the evaluated amplitude deviation and phase deviation; and
allowing the optical network unit to adjust the amplitude and phase of the signal which is to be outputted to the optical line termination device, in accordance with the amplitude adjustment magnitude and phase adjustment magnitude which are contained in the amplitude/phase control signal, and to output the adjusted signal.

* * * * *